(12) United States Patent
Yamamoto et al.

(10) Patent No.: US 7,269,646 B2
(45) Date of Patent: Sep. 11, 2007

(54) METHOD FOR COUPLING STORAGE DEVICES OF CLUSTER STORAGE

(75) Inventors: Yasutomo Yamamoto, Sagamihara (JP); Noboru Morishita, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 452 days.

(21) Appl. No.: 10/768,648

(22) Filed: Feb. 2, 2004

(65) Prior Publication Data

US 2005/0144173 A1 Jun. 30, 2005

(30) Foreign Application Priority Data

Dec. 3, 2003 (JP) ............... 2003-403968

(51) Int. Cl.
*G06F 15/173* (2006.01)
(52) U.S. Cl. ............ 709/223; 709/205; 709/211; 709/212; 709/224; 709/225; 711/118; 711/152; 707/10
(58) Field of Classification Search ........... 709/205, 709/211, 223, 224, 225; 711/118, 162
See application file for complete search history.

(56) References Cited

U.S. PATENT DOCUMENTS

| | | | |
|---|---|---|---|
| 5,964,886 A | 10/1999 | Slaughter et al. | |
| 6,173,293 B1 | 1/2001 | Thekkath et al. | |
| 6,216,202 B1 | 4/2001 | D'Errico | |
| 6,256,740 B1 | 7/2001 | Muller et al. | |
| 6,438,663 B1 | 8/2002 | Agarwal et al. | |
| 6,542,961 B1 | 4/2003 | Matsunami et al. | |
| 6,587,921 B2 * | 7/2003 | Chiu et al. ............ | 711/119 |
| 6,633,962 B1 | 10/2003 | Burton et al. | |
| 6,728,849 B2 * | 4/2004 | Kodama ............ | 711/162 |
| 2002/0019907 A1 | 2/2002 | McMurdie et al. | |
| 2002/0161869 A1 | 10/2002 | Griffin et al. | |
| 2003/0088746 A1 | 5/2003 | Hino et al. | |

FOREIGN PATENT DOCUMENTS

JP  A-07-152491  6/1995

* cited by examiner

*Primary Examiner*—Yves Dalencourt
(74) *Attorney, Agent, or Firm*—Mattingly, Stanger, Malur & Brundidge, P.C.

(57) ABSTRACT

In a cluster storage system, storage areas scattered in a plurality of storage nodes are coupled into a single storage area for access by a host computer. The cluster storage system has a first storage node and a second storage node, each of which has a disk and a control processor for controlling input/output to/from the disk, and a host interface node for connecting the first and second storage nodes to a computer. The first storage node manages a storage area having a first storage area existing in the first storage node and a second storage area existing in the second storage node as a logical device. Upon receipt of an access request having identification information corresponding to the logical device from the computer, the host interface node forwards the access request to the first storage node.

9 Claims, 18 Drawing Sheets

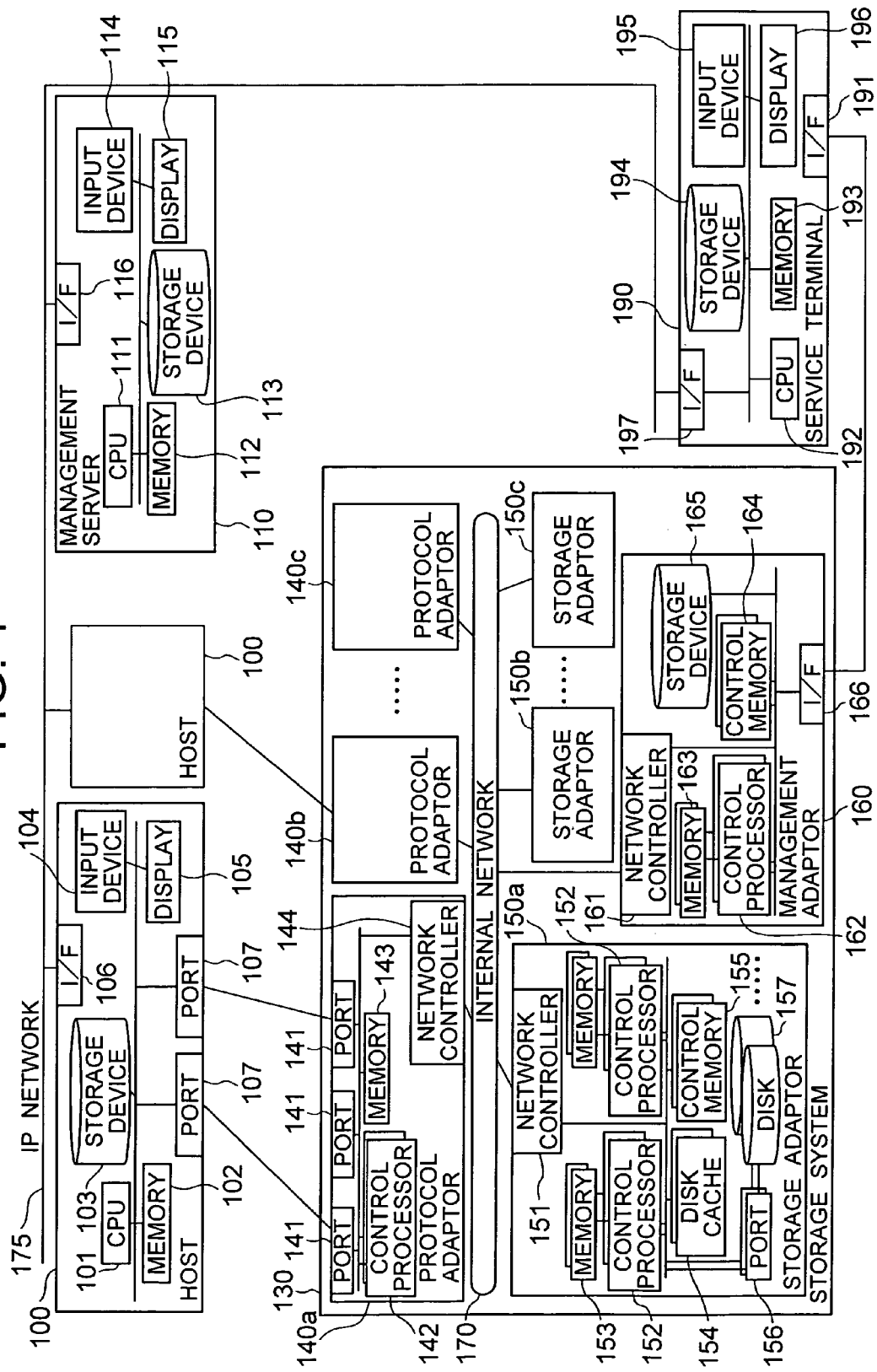

FIG. 9

CONFIGURATION INFORMATION OF PHYSICAL DEVICE #0

203

| | |
|---|---|
| PHYSICAL DEVICE NUMBER | ~91 |
| SIZE | ~92 |
| DEVICE STATE | ~93 |
| PERFORMANCE/RELIABILITY LEVEL | ~94 |
| CORRESPONDING LOWER LOGICAL DEVICE NUMBER | ~95 |
| RAID CONFIGURATION (RAID LEVEL, THE NUMBER OF DATA/PARITY) | ~96 |
| STRIPE SIZE | ~97 |
| DISK NUMBER LIST | ~98 |
| START OFFSET IN DISK, SIZE | ~99 |
| ⋮ | |

LU PATH DEFINITION
PROCESSING 252

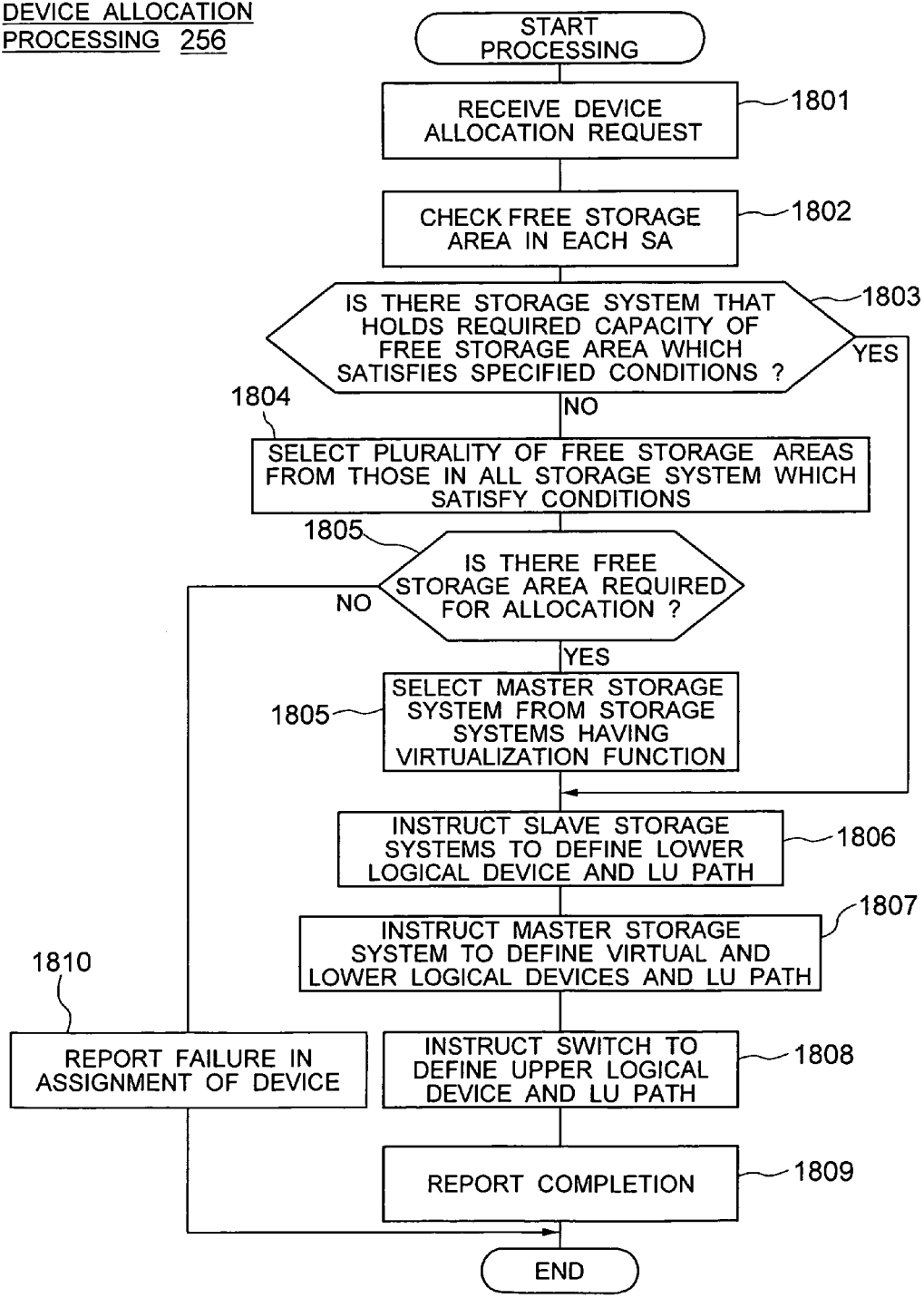

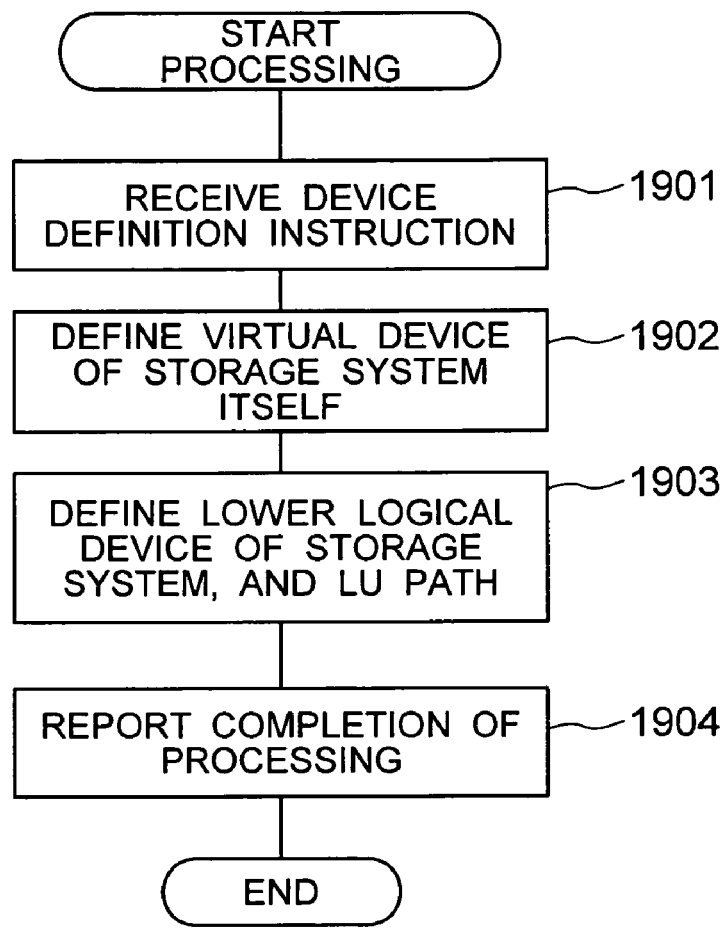

METHOD FOR COUPLING STORAGE DEVICES OF CLUSTER STORAGE

BACKGROUND OF THE INVENTION

The present invention relates to a storage system for storing data for use by computers in a computing system, and more particularly, to a storage system which employs a cluster configuration.

In recent years, the amount of data handled by computers has been dramatically increased, leading a tendency to increasingly higher capacities of storages for storing the data. An approach for reducing the management cost of a large capacity storage is implemented in a system design which relies on an intensive storage of a large amount of data on a single high-performance, highly reliable, and highly available large storage device, rather than a distributed storage of a large amount of data on multiple small storage devices. A smaller number of storage devices to be managed can result in a reduction in the management cost for the storage which would be required for maintenance, fault recovery and the like.

However, when a single storage system stores a large amount of data and is connected to a multiplicity of host computers, the storage system requires a larger number of control processors and disk devices mounted therein. Since these numerous control processors and disk devices must be associated with one another at a high speed, enormous challenges arise in a technical aspect as well as in respect of cost both in hardware and software for increasing the processing speed on an internal bus and a control memory, avoiding contentions among the control processors, and the like.

As disclosed in U.S. Pat. No. 6,256,740, the application of clustering to the storage may be contemplated for meeting the foregoing challenges to provide a large-scale and low-cost large storage.

A cluster storage system has a plurality of relatively small storage nodes interconnected through an interconnection mechanism such as a switch to implement a large capacity storage system through the clustering. While a variety of implementations can be seemingly applied to the cluster storage system, they are identical in that input/output requests received by a cluster storage system are distributed to storage nodes which contain devices associated with the respective input/output requests, so that each of the input/output requests is processed in each storage node associated therewith. Generally, each storage node is similar to a normal storage system in that it comprises a host interface, a disk device, control processors, memories, a control memory, a disk cache, and the like, and these components are coupled to one another through an internal network in the storage node. Each of the storage nodes processes the associated input/output request directed to the disk device using these internal components.

In this event, since the disk cache and control memory in each storage node are shared only among the control processors in the node, the cluster storage system can relax the performance requirements to the internal bus and memories. Further, a plurality of storage nodes may be coupled to create a cluster storage system which provides a storage capacity required by a certain computing system, thereby realizing a scalable storage system which has a variety of storage capacities from a small capacity to a large capacity. It should be noted that in a cluster storage system, control data and data stored in the disk devices are communicated among respective storage nodes through an interconnection mechanism in order to associate data among the disk devices for purposes of data duplication, internal data relocation, and the like.

SUMMARY OF THE INVENTION

In a cluster storage system, resources such as a disk device, a disk cache and the like are controlled only by a local control processor in each storage node, and are not shared by nodes. This node-by-node control scheme implies problems in the management of the storage capacities of disk devices distributed in the respective storage nodes, more specifically, determination of the capacity for a disk device installed in each storage node, adjustments of allocated storage capacities among the storage nodes in the event of allocation of volumes to host computers (the volume is the unit of storage in a cluster storage by which storage areas are allocated to respective host computers, wherein a host computer recognizes one volume as one disk device), management of the capacities of unused free storage areas which are not allocated to host computers, and the like.

Particularly, in the management of the capacities of free storage areas, it is preferable to gather such free storage areas into a least possible number of storage nodes to ensure a large size of free storage area in each storage node and to allocate free storage areas in a least possible number of storage nodes to a host computer for allocating required capacities of volumes in response to a volume allocation request from a user who manages the host computer (in other words, it is more preferable to allocate a single volume made up of free storage areas scattered in a least possible number of storage nodes to a host computer than to allocate a single volume made up of free storage areas scattered in a multiplicity of storage nodes to a host computer). However, in view of balanced loading among the storage nodes, it is preferable to avoid variations in allocated capacities of storage areas among the storage nodes, in other words, to distribute free storage areas in all the storage nodes without impartiality. Also, in an environment in which volumes are dynamically allocated and deallocated, free storage areas tend to scatter in respective storage nodes. For gathering the free storage areas in a small number of storage nodes, data stored in used storage areas within such a small number of storage nodes must be moved to a free storage area of another storage node, possibly resulting in an extra high likelihood that the data move processing affects I/O processing from a host computer. It is therefore contemplated that in a cluster storage system, free storage areas can be scattered in a plurality of storage nodes with ease. On the other hand, when there exists no storage node which has a required capacity of free storage area upon receipt of a volume allocation request from a host computer, the allocation request may be suspended or rejected, or storage administrator may install an additional disk device in a particular storage node to allocate a volume as required in some form of service. However, this form of service can be incapable of responding to a volume allocation request from a host computer, and take a long time period until volumes are actually allocated, thereby failing to satisfy a request from a user of a host computer which immediately requires a volume.

As appreciated from the foregoing, a critical function in the cluster storage system is to couple free storage areas scattered in a plurality of storage nodes into a single volume which is provided to the user (this function is hereinafter called the "volume coupling function").

To address the foregoing problems, the present invention discloses a technique for use in a cluster storage system to couple storage areas scattered in a plurality of storage nodes-into a single storage area for access by a host computer. The present invention also discloses a technique for a certain storage system to couple a plurality of storage areas scattered in a plurality of storage systems into a single storage area for access by a host computer.

In one aspect of the present invention, a cluster storage system has a first storage node and a second storage node, each of which has a disk and a control processor for controlling input/output to/from the disk, and a host interface node for connecting the first and second storage nodes to a computer. The first storage node manages a storage area having a first storage area existing in the first storage node and a second storage area existing in the second storage node as a logical device. Upon receipt of an access request having identification information corresponding to the logical device from the computer, the host interface node forwards the access request to the first storage node.

In another aspect of the present invention, a computing system has a first storage system and a second storage system, each of which has a disk and a control processor for controlling input/output to/from the disk, and a switch for connecting the first and second storage systems to a computer. The first storage system manages a logical device comprised of a first storage area in the first storage system and a second storage area in the second storage system. Upon receipt of an access request having identification information corresponding to the logical device, the switch forwards the access request to the first storage system.

According to the cluster storage system as described above, one storage node can couple free storage areas scattered in a plurality of storage nodes into a single device managed by the one storage node. On the other hand, according to the computing system as described above, one storage system can couple free storage areas scattered in a plurality of storage systems into a single logical device managed by the one storage system.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram illustrating an exemplary hardware configuration of a computing system to which the present invention is applied;

FIG. 9 is a table showing an example of physical device management information;

FIG. 18 is a flowchart illustrating another exemplary routine for the device allocation processing;

FIG. 19 is a flowchart illustrating an exemplary routine for storage device definition processing.

DESCRIPTION OF THE EMBODIMENTS

Figure 2A:
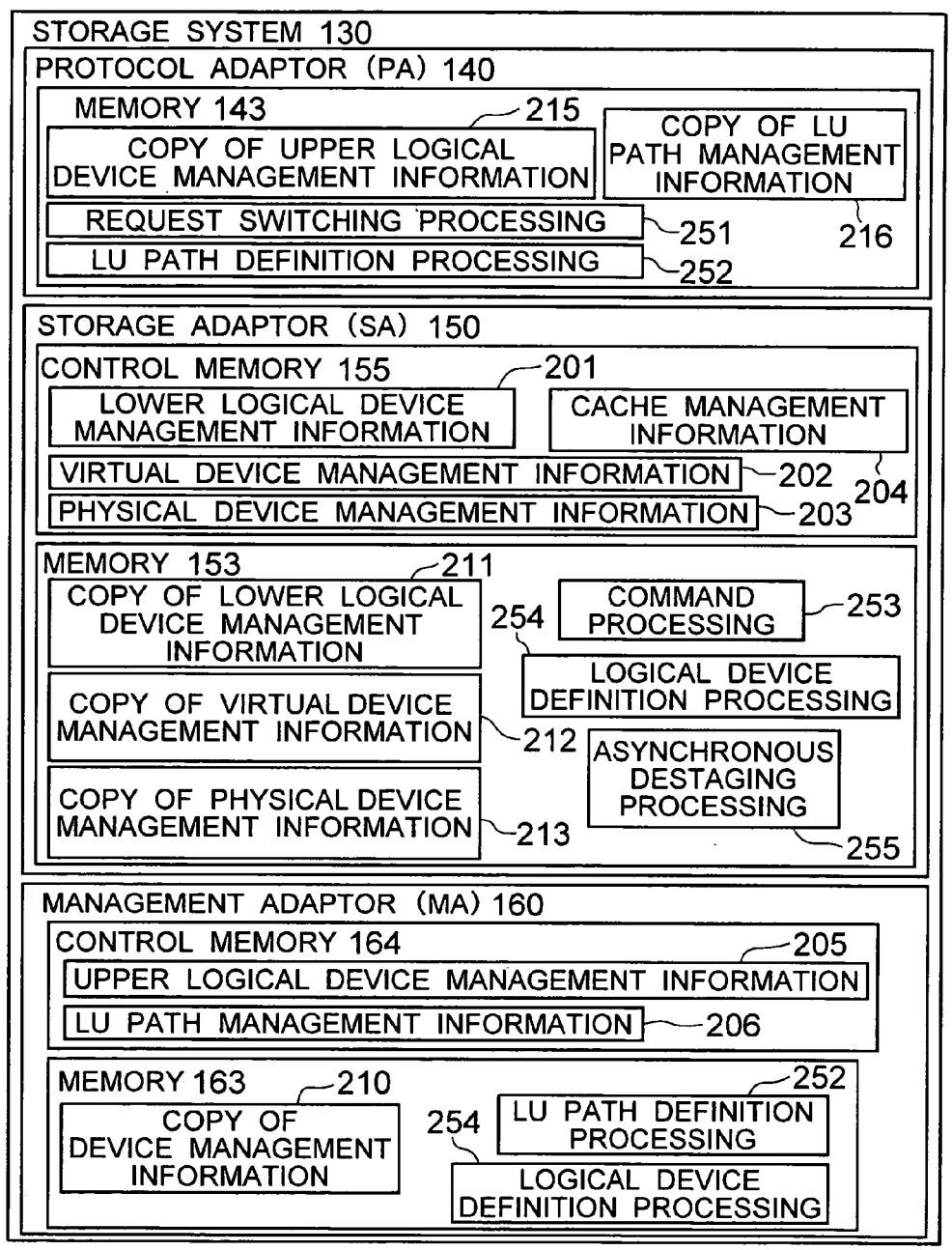
FIGS. 2A and 2B are block diagrams illustrating an exemplary software configuration of a storage system to which the present invention is applied.

As representative embodiments according to the present invention, a first to a third embodiment will be described below in brief.

A first embodiment shows an exemplary cluster storage system which comprises a plurality of storage nodes (hereinafter also called the "storage adaptor"); a host interface node connected to a host computer (hereinafter also called the "protocol adaptor"); and an internal network for connecting the plurality of storage adaptor and protocol adaptor, wherein free storage areas scattered in a plurality of storage adaptors are coupled by a representative storage adaptor (master storage adaptor) to manage them as a single logical device. In the first embodiment, the protocol adaptor receives an access request to a logical device from the host computer, and forwards the access request to the master storage adaptor. The master storage adaptor determines to which of the storage adaptors the received access request is directed, and forwards the access request to a selected storage adaptor.

A second embodiment shows an exemplary cluster storage system similar to the first embodiment, wherein the protocol adaptor also recognizes coupling boundaries of a logical device created by the master storage adaptor by coupling free storage areas, and the protocol adaptor, upon receipt of an access request from the host computer to the logical device, selects a storage adaptor associated with the access in accordance with an access intended address, and directs the access request to the selected storage adaptor.

A third embodiment shows an exemplary computer system which comprises a plurality of storage systems including a storage system that has a device virtualization function for virtualizing a device of another storage system as a device of the storage system itself, and an intelligent switch having a similar device virtualization function for connecting the plurality of storage systems to one another, wherein a representative storage system couples free storage areas scattered in a plurality of storage systems for providing the intelligent switch with the resulting logical device.

[First Embodiment]

Referring first to FIGS. 1 to 3 and 5 to 15, the first embodiment will be described in greater detail.

FIG. 1 is a block diagram illustrating an exemplary hardware configuration of a computing system to which the first embodiment of the present invention is applied.

The computing system comprises one or more host computers (hereinafter also called the "host") 100; a management server 110; a storage system 130; and a service terminal 190. The host 100 has one or more ports 107, while the storage system 130 has one or more ports 141, such that the host 100 is connected to the storage system 130 through the respective ports 107, 141. The host 100 and storage system 130 are also connected to the management server 110 through an IP network 175, such that they are integrally managed by storage management software, not shown, which runs on the management server 110. In the first embodiment, the storage system 130 is connected to the management server 110 through the service terminal 190, but alternatively, the storage system 130 may be directly connected to the IP network.

The host 100, which is a computer having a CPU 101, a memory 102, a storage device 103, and the like, reads software such as an operating system, an application program, and the like, stored in the storage device 103 such as a disk drive, a magneto-optical disk drive or the like, into the memory 102, and causes the CPU 101 to read the software from the memory 102 for execution of a variety of processing to accomplish predetermined functions. The host 100 also comprises an input device 104 such as a keyboard, a mouse and the like, and an output device such as a display 105 and the like, such that the input device 104 receives an input from a host manager or the like, and the output device 105 displays information indicated by the CPU 101. The host 100 also comprises one or more ports 107 for connection with the storage system 130; and one or more interface controllers 106 for connection with the IP network 175.

The management server 110, which is a computer having a CPU 111, a memory 112, a storage device 113, an input device 114, an output device 115, and an interface controller 116 for connection with the IP network 175, reads storage management software or the like stored in the storage device 113 such as a disk drive, a magneto-optical disk drive or the like into the memory 112, and causes the CPU 111 to read the storage management software for execution of processing for the operation, maintenance and management of the overall computing system to accomplish predetermined functions. As the CPU 111 executes the storage management software, the management server 110 collects configuration information, resource utilization ratio, performance monitoring information and the like from each of the devices in the computing system from the interface controller 116 through the IP network 175. Then, the management server 110 outputs the collected information on the output device such as a display 115 for presentation to a storage manager. The management server 110 also receives instructions from the storage manager through the input device 114 such as a keyboard, a mouse or the like, and forwards the received operation/maintenance instructions to associated devices through the interface controller 116.

The storage system 130, which is in a cluster configuration, specifically comprises a plurality of protocol adaptors 140, a plurality of storage adaptors 150, a management adaptor 160, and an internal network 170 which interconnects these components 140, 150, 160.

Each of the protocol adaptors 140 comprises a plurality of ports 141 connected to the internal network 170, one or more control processors 142, a memory 143, and a network controller 144. The control processor 142 identifies a device which is to be accessed in response to an input/output request received from one of the ports 141, and the network controller 144 transfers the input/output request and data to an appropriate storage adaptor 150 through the internal network 170 based on the identified device to be accessed. In this event, the control processor 142 identifies the device to be accessed from a port ID and a LUN (Logical Unit Number) included in the input/output request received from the host 100.

Figure 3:
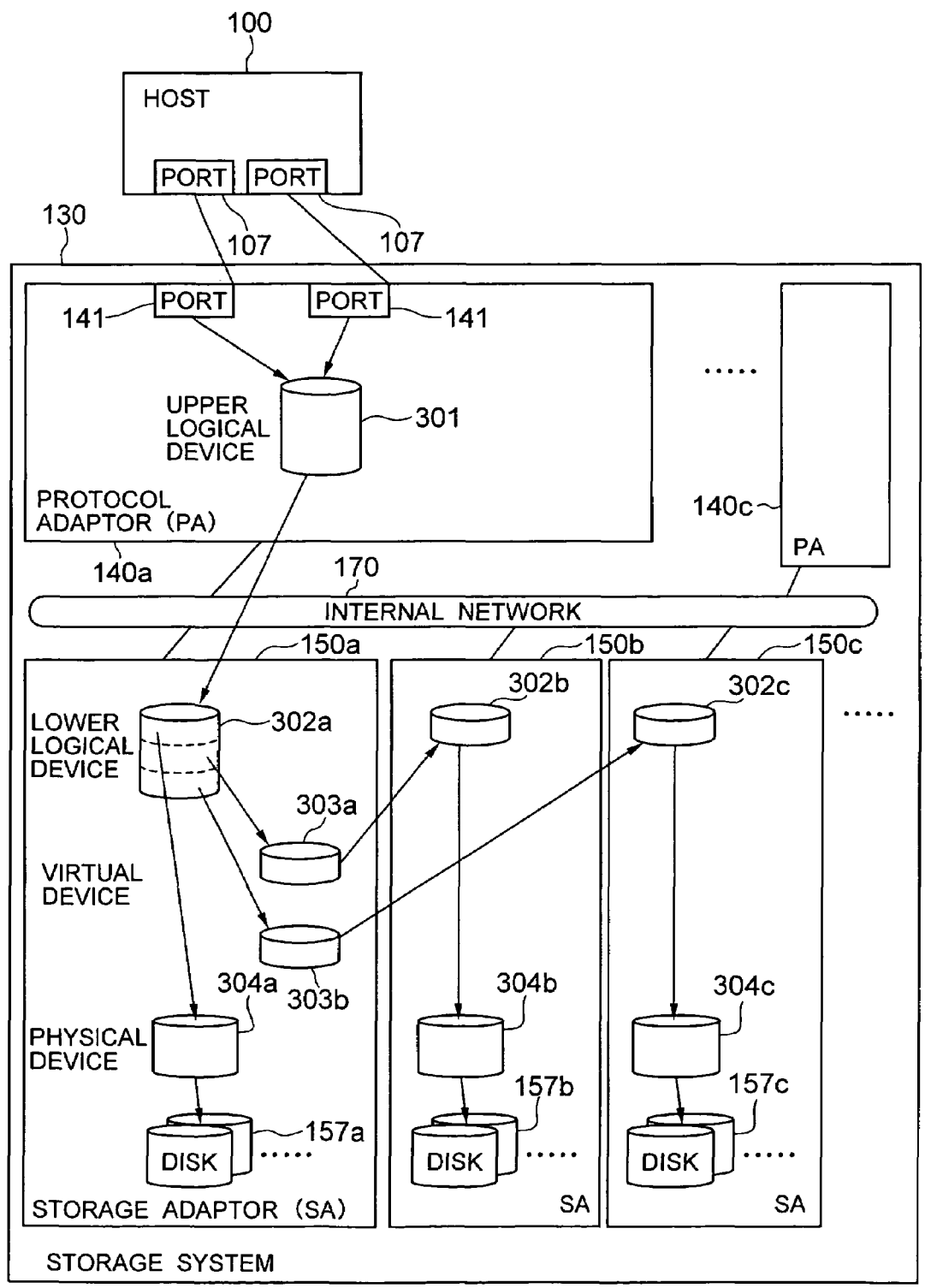
FIG. 3 is a block diagram illustrating an exemplary device hierarchy in the storage system to which the present invention is applied.

FIG. 3 illustrates an exemplary device hierarchy in the cluster storage system (i.e., storage system 130) in the first embodiment. The storage system 130 in the first embodiment has the following device hierarchy because devices provided by a plurality of storage adaptors 150 are collected into a single logical device which is provided to the host 100.

First, a plurality of disk devices 157 make up a disk array in the storage adaptor 150. This disk array is managed as a physical device 304 by the storage adaptor 150. Further, in the storage adaptor 150, a lower logical device 302 is assigned to a physical device mounted in the storage adaptor 150 (in other words, the storage adaptor 150 makes the physical device 304 correspond to the lower logical device 302). A lower logical device is a logical device managed in each of the storage adaptors 150, and its number is managed independently by the associated storage adaptor 150. The lower logical device is associated to an upper logical device 301 by the management adaptor 160, and is also associated to LUN (Logical Unit Number) assigned to each of the ports 141 by the protocol adaptor 140, and is provided to the host 100 as a device of the storage system 130. Stated another way, it is an upper logical device of the storage system 130 that is recognized by the user who utilizes the host, whereas the host 100 accesses data stored in the storage system 130 using the LUN assigned to a port 141 corresponding to the upper logical device.

In the first embodiment, the storage adaptor 150 has a device virtualization function for virtualizing a lower logical device managed in another storage adaptor 150 to use the virtualized device as if it were a physical device managed in the storage adaptor 150 itself. Such a lower logical device associated with another storage adaptor 150 and managed through the virtualization function is called a "virtual device 303." The lower logical device is created by coupling one or more physical devices or virtual devices (i.e., lower logical devices associated with other storage adaptors 150). Thus, the storage adaptor 150 makes one or more physical devices or virtual devices correspond to a single lower logical device which is managed by the storage adaptor 150. It should be noted that the virtual device is also managed independently in the associated storage adaptor 150.

In accordance with the device hierarchy as described above, the protocol adaptor 140 calculates an upper logical device number involved in an access, from the port ID and LUN included in an input/output request, and identifies the storage adaptor 150 and the lower logical device number associated with the upper logical device. Then, the protocol adaptor 140 adds information required to calculate the identified lower logical device number to the input/output request, and transmits the resulting input/output request to the identified storage adaptor 150.

In the first embodiment, the ports 141 are assumed to be those ports which support the Fibre Channel interface subordinate to SCSI (Small Computer System Interface) as an upper protocol, but may be ports which support another storage connection network interface such as the IP network interface subordinate to SCSI as an upper protocol.

Turning back to FIG. 1, the storage adaptor 150 comprises one or more ports 156; one or more disk devices 157 connected to the ports 156, respectively; one or more control processors 152; one or more memories 153 associated with the processors 152, respectively; one or more disk caches 154; one or more control memories 155; and a network controller 151 connected to the internal network 170.

The control processor 152 processes an input/output request received by the network controller 151 through the internal network 170 and directed to the disk device 157 in the same storage adaptor 150. The control processor 152 also manages the correspondence relationships among the physical device 304, virtual device 303 and lower logical device 302, and the correspondence relationship between the virtual device 303 and lower logical devices 302 belonging to other storage adaptors 150, as well as converts an access request to a lower logical device to an access request to a physical device or disk device 157. The control processor 152 further executes a variety of processing for implementing a data association function such as data duplication, data relocation and the like.

The disk cache 154 previously stores data frequently read from the disk device 157, and temporarily stores write data received from the host 100 in order to increase the processing speed for an access request from the host 100. For executing asynchronous destage processing using the disk cache 154, i.e., when the storage system 130 returns a response to a write request to the host 100 before the write data is actually written into the disk device 157, after write data received from the host 100 has been stored in the disk cache 154, it is necessary to ensure that the write data stored in the disk cache 154 is not lost before it is written into the disk device 157. To meet this requirement, the disk cache 154 is preferably improved in availability by making the disk cache 154 non-volatile by use of a backup battery, duplexing the disk cache 154 for a higher immunity to faults in media, and the like.

The control memory 155 stores control information for managing the disk devices 157, physical device 304 made up of one or a combination of plural disk devices 157, or virtual device 303 which is a lower logical device associated with another storage adaptor 150 and is managed virtually in a manner similar to a physical device, and the correspondence relationship between the physical devices or virtual devices and the lower logical device. When the control information stored in the control memory 155 is erased or lost, data stored in the disk device 157 cannot be accessed, so that the control memory 155 is preferably designed for a higher availability by making it non-volatile by use of a backup battery, duplexing the control memory 155 for a higher immunity to faults in media, and the like.

In the storage system 130 according to the first embodiment, a plurality of disk devices 157 are collected and defined as a single or a plurality of physical devices (in other words, a plurality of disk devices 157 are made collectively correspond to a single or a plurality of physical devices), a single lower logical device is assigned to one or more physical devices or virtual devices, and a single upper logical device is assigned to a single lower logical device, so that the upper logical device is accessed by the host 100. Alternatively, however, each of the disk devices 157 may be provided to the host 100 as a single physical device and a single lower logical device or upper logical device, thereby permitting the host 100 to directly access the device.

The management adaptor 160 comprises one or a plurality of control processors 162; one or a plurality of memories 163 associated with the respective control processors 162; one or a plurality of control memories 164; a storage device 165; a network controller 161 connected to the internal network 170; and an interface controller 166. A control program stored in the storage device 165 such as a hard disk device is read into the memory 163, and executed by the control processor 162 to carry out predetermined processing for management of the configuration and faults for the storage system 130. The control processor 162 transmits configuration information to a service terminal 190 connected thereto through the interface controller 166 for presenting the configuration information to a storage manager, and upon receipt of maintenance and/or operation instructions entered from the manager into the service terminal 190, performs processing involved in modifications to the configuration and the like in accordance with the received instructions.

The configuration information of the storage system 130 is stored in the control memory 164 in the management adaptor 160. Since the configuration information on the control memory 164 can be referenced and/or updated from the control processor 142 of the protocol adaptor 140 or the control processor 152 of the storage adaptor 150, the configuration information can be shared among the respective protocol adaptors 140 and respective storage adaptors 150 of the storage system 130. When the management adaptor 160 falls into an inoperative state due to a fault or the like, the overall storage system 130 cannot be accessed, so that it is preferable to duplex each of the components in the management adaptor 160 or to simply provide a plurality of the management adaptors 160 in the storage system 130 to simply duplex the management adaptors 160. In addition, interfaces (I/F) may be separately provided for interfacing from the service terminal 190 to the one or more storage controllers 150 such that the storage controllers 150 and service terminal 190 share the control conducted by the management adaptor 160, thereby implementing the management adaptor 160 only by the control memory 164. Further, the information stored in the control memory 164 may be held in the control memories 155 of one or more storage adaptors 150 to omit the management adaptor 160.

The internal network 170 interconnects the protocol adaptor 140, storage adaptor 150 and management adaptor 160 to transmit/receive data, control information and configuration information among the components of these adaptors. The internal network 170 enables the management adaptor 160 to distribute the configuration information of the storage system 130 to the protocol converters 140 and storage converters 150 provided in the storage system 130, and to acquire the configuration information from any of the protocol adaptors 140 and storage adaptors 150 to manage the configuration of the storage system 130. Also, since the internal network 170 transfers an access request between the protocol adaptor 140 and storage adaptor 140, the host 100 can access a disk device belonging to the storage adaptor 150 from an arbitrary port 141 of the protocol adaptor 140. The internal network 170 is preferably multiplexed as well from a viewpoint of a higher availability.

The service terminal 190 comprises a CPU 192; a memory 193; a storage device 194; an interface controller 191 connected to the management adaptor 160; an interface controller 197 connected to the IP network 175; an input device 195 for receiving an input from the storage manager; and an output device such as a display 196 for outputting the configuration information and management information of the storage system 130 to the storage manager. The CPU 192 reads a storage management program stored in the storage device 194 into the memory 193, and executes the storage management program to reference the configuration information, instruct modifications to the configuration, instruct the activation of a particular function to serve as an interface between the storage manager or management server 110 and the storage system 130 with respect to the maintenance operation of the storage system 130. In an alterative, the service terminal 190 may be omitted, in which case the storage system 130 is connected directly to the management server 110 and managed by management software which runs on the management server 110.

Figure 2B:
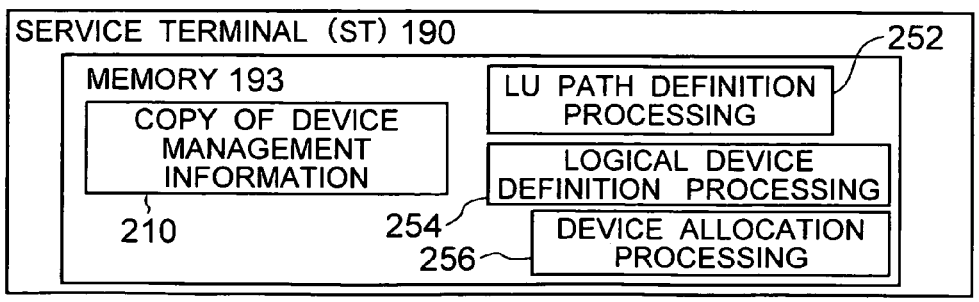

Next, description will be made on the software configuration of the storage system 130 according to the first embodiment of the present invention. FIG. 2 is a block diagram illustrating the software configuration of exemplary programs for processing control information and storage control, stored in the control memory 155 or memories 153, 193 of the respective storage system 130 and service terminal 190.

In the following description, the protocol adaptor 140 is designated by PA; the storage adaptor 150 by SA; the management adaptor 160 by MA; and the service terminal by ST for simplifying the representations.

Configuration management information of the storage system 130 comprises lower logical device management information 201, virtual device management information 202, physical device management information 203 and cache management information 204 stored in the control memory 155 of the SA 150, and upper logical device management information 205 and LU bus management information 206 stored in the control memory 164 of the MA 160.

Figure 5:
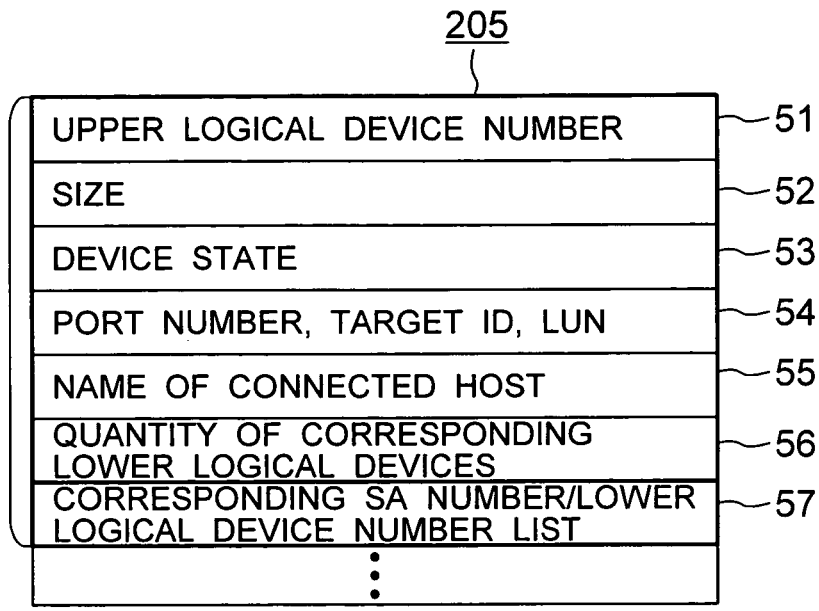
FIG. 5 is a table showing an example of higher logical device management information.

FIG. 5 shows an example of the upper logical device management information 205. The upper logical device management information 205 holds a set of information including an upper logical device number 51 to a corresponding SA number/lower logical device number list 57 for each upper logical device.

The upper logical device number entry 51 stores a number assigned to each upper logical device by the MA 160 for identifying the upper logical device. A size entry 52 stores the capacity of an upper logical device identified by the upper logical device number 51.

A device state entry 53 sets information indicative of the state of an associated upper logical device, which can be selected from "on-line," "off-line," "not mounted," and "off-line due to fault." "On-line" indicates that an associated upper logical device is normally operating and can therefore be accessed from the host 100. "Off-line" indicates that the upper logical device has been defined and is normally operating, but cannot be accessed from the host 100 for such reason as an undefined LU path or the like. "Not mounted" indicates that the upper logical device has not been defined and therefore cannot be accessed from the host 100. "Off-line due to fault" indicates that the upper logical device fails and therefore cannot be accessed from the host 100. The initial value for the device state 153 is "not mounted."

A port number in an entry 54 of the upper logical device management information 205 sets information indicative of which of a plurality of ports 141 the upper logical device is connected, i.e., port identification information for use in accessing the upper logical device. Here, the port identification information refers to a unique number assigned to each of the ports 141 in the storage system 130, and the entry 54 records the number of a port 141 on which LUN is defined for the upper logical device. A target ID and LUN stored in the same entry 54 serve as identifiers for identifying the upper logical device. In the first embodiment, the identifiers used for identifying an upper logical device are SCSI-ID and LUN which are used when a device is accessed from the host 100 on SCSI.

A connected host name entry 55 stores the host name which identifies the host 100 that is permitted to access the upper logical device. The host name may be any value such as WWN (World Wide Name) given to one of the ports 107 of the host 100, as long as it can uniquely identify the host 100 or port 107. The storage system 130 additionally holds management information related to attributes of each port 141 such as WWN.

A corresponding lower logical device quantity entry 56 holds the quantity of lower logical devices corresponding to the upper logical device. In the first embodiment, since upper logical devices are corresponding to lower logical devices on a one-to-one basis, "1" is set in the entry 56 at all times.

The corresponding SA number/lower logical device number list entry 57 stores, in the form of list, a set of information comprised of the number given to each of lower logical devices corresponding to the upper logical device, the number of the SA 150 to which the lower logical device belongs, and an offset in the upper logical device corresponding to the lower logical device to enumerate all the lower logical devices corresponding to the upper logical device. In the first embodiment, since one lower logical device is assigned to one upper logical device, the corresponding SA number/ lower logical device number list 57 is registered with one lower logical device, with the offset being set to zero. When an upper logical device has not been defined, an invalid value is set in the corresponding SA number/lower logical device number list entry 57. The lower logical device number in the entry 57 serves as an entry number in the lower logical device management information 201 of the SA 150 which manages the lower logical device.

Figure 6:
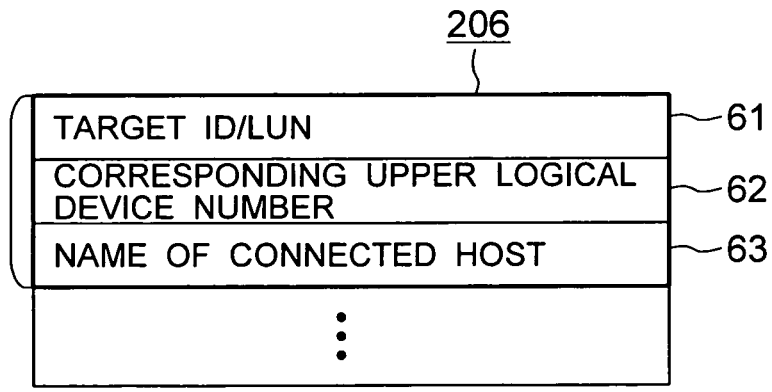
FIG. 6 is a table showing an example of LU path management information.

FIG. 6 shows an example of the LU path management information 206. The LU path management information 206 holds information for valid LUN's defined at the respective ports 141 included in the protocol adaptor 140 within the storage system 130. A target ID/LUN entry 61 stores the LUN defined for (assigned to) a port 141. A corresponding upper logical device number entry 62 stores the number of an upper logical device to which the LUN is assigned. A connected host name entry 63 stores information indicative of the host 100 which is permitted to access the LUN defined at the port 141. Information indicative of the host 100 may be, for example, the aforementioned WWN given to the port 107 of the host 100.

In some cases, the LUN's of a plurality of ports may be defined for (assigned to) a single upper logical device, so that the upper logical device can be accessed from the plurality of ports 141. In this event, a sum set of connected host names 63 in the LU path management information 206 related to each LUN of a plurality of ports 141 are held in the connected host name entry 55 in the upper logical device management information 205 related to the upper logical device.

Figure 7:
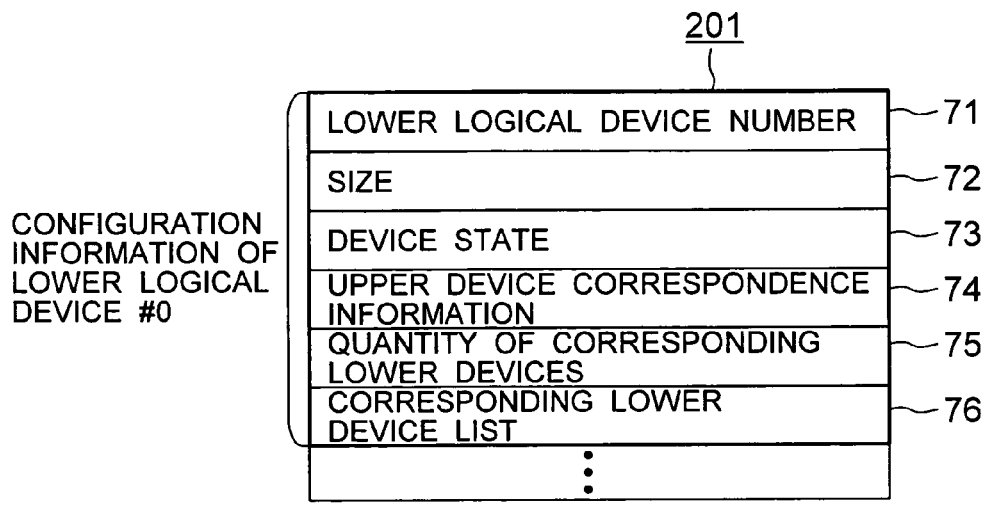
FIG. 7 is a table showing an example of lower logical device management information.

FIG. 7 shows an example of the lower logical device management information 201. Each SA 150 holds a set of information from a lower logical device number 71 to a corresponding lower device list 76 for each of lower logical devices which belong to the SA 150 itself. The lower logical device number entry 71 is registered with an identification number for identifying a lower logical device. A size entry 72 stores the capacity of a lower logical device identified by the lower logical device number 71. A device status entry 73 sets information indicative of the state of the lower logical device. Since the value for the device status 73 is the same as the device state 53 in the upper logical device management information 205, description thereon is omitted. Note, however, that the "on-line state" of a lower logical device indicates that the lower logical device is associated with an upper logical device or with a virtual device of another SA 150.

An upper device correspondence information entry 74 sets the number given to an upper logical device corresponding to the lower logical device, or the SA number of another SA 150 and a virtual device number.

A corresponding lower device quantity entry 75 stores the quantity of physical devices which make up the lower logical device, or the quantity of virtual devices, while the corresponding lower device list entry 76 stores a list which enumerates identification information of these devices. When no physical device or virtual device is assigned to the lower logical device, zero is set to the entry 75. The device number registered in the entry 76 serves as the entry number of the physical device management information 203 held by the SA 150 which manages the associated lower logical device, or the entry number of the virtual device management information 202.

Figure 8:
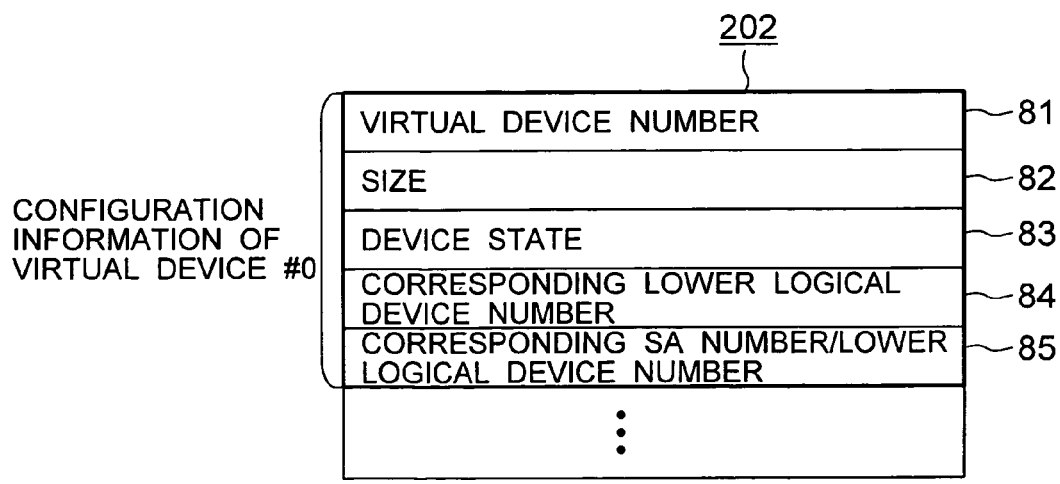
FIG. 8 is a table showing an example of virtual device management information.

FIG. 8 shows an example of the virtual device management information 202 for use in managing a lower logical device of a different SA 150 as a physical device of the SA itself. Each SA 150 holds a set of information from a virtual device number 81 to a corresponding SA number/lower logical device number 85 for each of virtual devices defined in the SA 150 itself. The virtual device number entry 81 is registered with an identification number for uniquely identifying a virtual device in the SA 150. A size entry 82 stores the capacity of the virtual device. A device state entry 83 sets information indicative of the state of the virtual device. Since the values possibly set for the device state 83 are the same as those for the device state 73 in the lower logical device management information 201, description thereon is omitted. A corresponding lower logical device number entry 84 sets a lower logical device number to which the virtual device is assigned. The corresponding SA number/lower logical device number entry 85 is registered with the identification number for a lower logical device in another SA 150 (identification number assigned to the lower logical device by the other SA 150), defined as the virtual device, and the identification number of this SA 150.

FIG. 9 shows an example of the physical device management information 203 for managing physical devices which are comprised of the disk devices 157 in the SA 150. Each SA 150 holds a set of information from a physical device number 91 to start offset in disk and size 99 for each of physical devices existing in the SA 150 itself.

The physical device number entry 91 is registered with an identification number for identifying a physical device. A size entry 92 stores the capacity of a physical device identified by the physical device number 91. A device state entry 93 sets information indicative of the state of the physical device, which can be selected from "on-line," "off-line," "not mounted," and "off-line due to fault." "On-line" indicates that an associated physical device is normally operating, and assigned to a lower logical device. "Off-line" indicates that the physical device has been defined and is normally operating, but has not been assigned to any lower logical device. "Not mounted" indicates that the physical device has not been defined on the disk device 157. "Off-line due to fault" indicates that the physical device fails and therefore is not assigned to any lower logical device. Assume in the first embodiment that physical devices have been previously created on the disk devices 157 before the shipment of products from the factory for simplicity. From this assumption, the initial value for the device state 93 is set to "off-line" for available physical devices, and to "not mounted" for the remainders.

A performance/reliability level entry 94 holds values representative of the evaluation for the performance and reliability of the physical device in accordance with certain criteria which are unified at least within the computing system. Possible indexes for determining the performance level may include performance values such as a seek speed, a rotational speed and the like, the capacity, a RAID level, and the like of the disk device 157 belonging to the physical device. On the other hand, possible indexes for the reliability level may include a variety of conditions on product specifications such as the redundancy, a RAID level, an available number of alternative passes, and the like of the physical device.

A corresponding lower logical device number entry 95 stores the number given to a lower logical device to which the physical device is corresponding. When the physical device is not assigned to any lower logical device, an invalid value is set to the entry 95.

A RAID configuration entry 96 holds information related to the RAID configuration including the RAID level, the quantity of data disks, the quantity of parity disks and the like of the disk device 157 to which the physical device has been assigned. Likewise, a stripe size entry 97 holds a data division unit (stripe) length in the RAID. A disk number list entry 97 holds an identification number for each of a plurality of disks 157, which make up the RAID, to which the physical device has been assigned. The identification number of the disk device 157 is a unique value given for identifying the disk device 157 in the SA 150. Start offset in disk and size entry 99 stores information indicative of in which region of each disk device 157 the physical device is assigned. For simplicity, in the first embodiment, the offset and size are unified in each of the disk devices 157, which make up the RAID, for all physical devices.

Turning back to FIG. 2, description will be next made on information and programs stored in the memory 143 within the PA 140 of the storage system 130; in the memory 153 within the SA 150; in the memory 163 within the MA 160; and in the memory 193 within the service terminal 190.

Each control information stored in the control memory 155 within the SA 150 and in the control memory 164 within the MA 160 can be referenced and/or updated from the control processor 152, 142, 162, in each of the SA 150, each of the PA 140, and the MA 160, in which case, however, the control information must be accessed through the internal network 170 and the like. Thus, for improving the processing performance, a copy of control information required for the processing executed by each control processor 152, 142, 162 is held in the memory 153, 143, 163 of the associated adaptor (specifically, SA, PA or MA). When the control information managed by each adaptor is updated as a result of a configuration modification, the adaptor notifies the other adaptors to that effect through the internal network 170 so that the most recent information is captured from the control memory of the adaptor to the memories of the respective adaptors.

In addition to the copy of the control information, the memory in each adaptor stores a control program which runs on the control processor in each adaptor.

In the first embodiment, a method of controlling the storage system 130 will be described in connection with exemplary processing for defining a free storage area existing in the SA 150 of the storage system 130 as an upper logical device of the storage system 130, i.e., logical device definition processing and LU path definition processing, as well as a routine for processing an input/output request from the host 100 for the upper logical device of the storage device 130 thus defined. Associated with the foregoing processing, the memories 153, 143, 163 of the SA 150, PA 140 and MA 160 hold at least the following control information and programs.

The memory 143 of the PA 140 stores a copy 215 of the upper logical device management information, a copy 216 of the LU path management information, a program 251 for switching requests, and a program 252 for defining an LU path. The memory 153 of the SA 150 stores a copy 211 of the lower logical device management information, a copy 212 of the virtual device management information, a copy 213 of the physical device management information, a program 253 for processing a command, a program 254 for defining a logical device, and a program 255 for asynchronous destage processing. The memory 163 of the MA 160 stores a copy 210 of all device management information (i.e., the upper logical device management information, lower logical device management information, virtual device management information and physical device management information), the program 254 for defining a logical device, and the program 252 for defining an LU path. The memory 193 of the ST 190 stores the duplicate 210 of all device management information, the program 254 for defining a logical device, the program 252 for defining an LU path, and a program 256 for allocation a device.

Next, description will be made on storage control processing which is executed in each of the components.

The device allocation processing 256 is mainly executed by the control processor 192 of the service terminal 190 for making a physical device existing in the storage device 130 correspond to a logical device, and assigning the logical device to a particular host 100 to make the logical device available to the host 100. The device allocation processing 256 operates in association with the logical device definition processing 254 and LU path definition processing 252 which are executed by the control processor 162 of the management adaptor 160.

Figure 10:
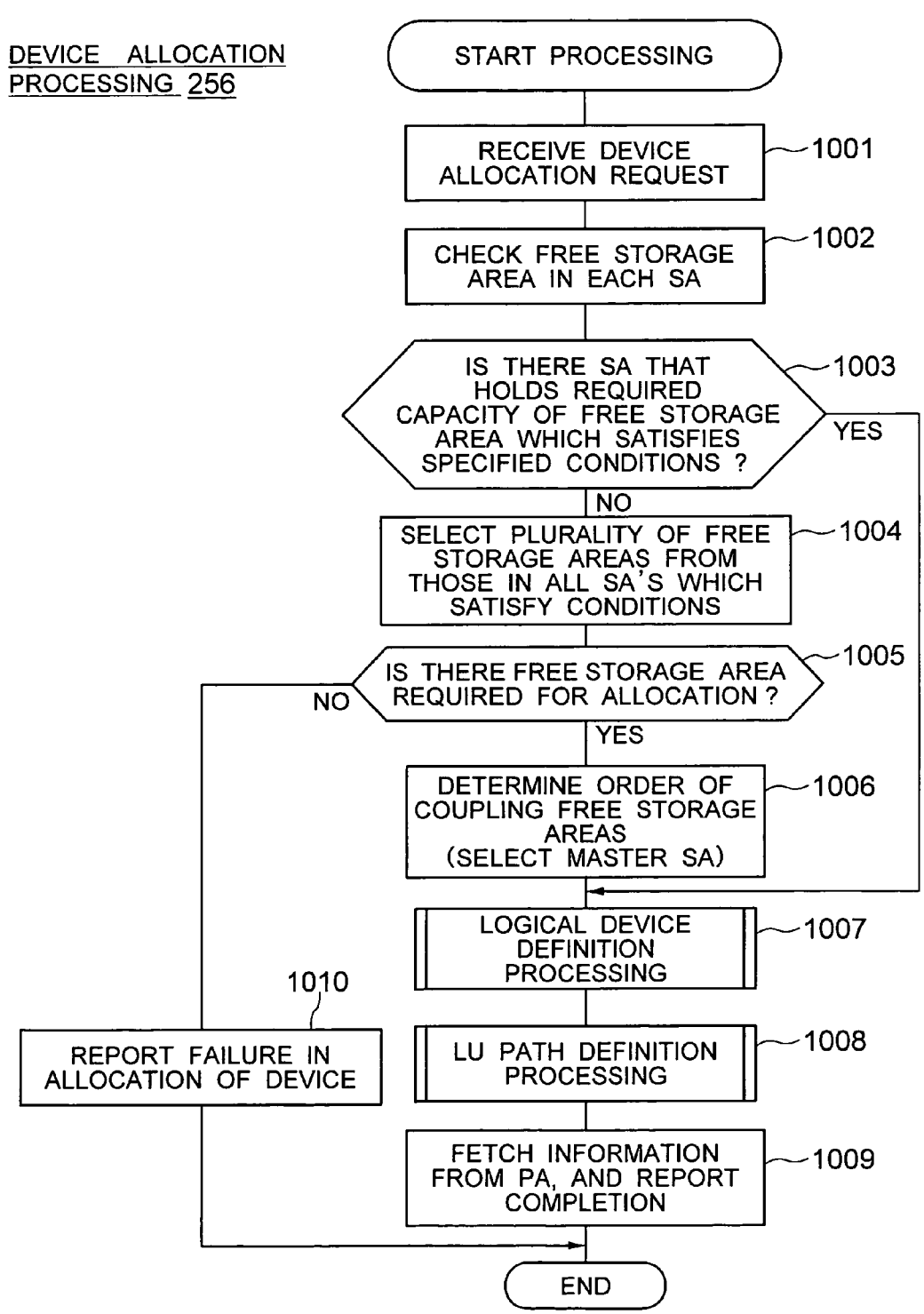
FIG. 10 is a flowchart illustrating an exemplary routine for device allocation processing.

FIG. 10 is a flowchart illustrating an exemplary processing flow of the device allocation processing 256. The device allocation processing 256, which is executed by the control processor 192 of the ST 190, involves assigning a logical device to a physical device in the storage device 130, defining an LU path for a specified port 141 for accessing the logical device, and providing the host 100 with the logical device.

First, the ST 190 receives a device allocation instruction from the storage manager or management server 110 (step 1001). In this event, the ST 190 receives parameters which indicate device allocation conditions, including the size and attributes of an allocated device, the identification information of the port 107 in the accessing host 100, the port number and LUN for defining the LU path, and the like. The device attributes may include information indicative of the performance, cost level, reliability, availability and the like of the device, such as access performance required to the device, a bit cost allowed to hold the device data, and the like.

Upon receipt of the device allocation instruction, the ST 190 references the physical device management information to search for free storage areas in each SA 150 of the storage system 130 to check whether any free storage area satisfies the device allocation conditions (steps 1002, 1003). A free storage area in the SA 150 has the device state 93 set to "off-line" in the physical device management information 203. At step 1002, the ST 190 checks the physical device management information 203 corresponding to each SA 150 to retrieve those free storage areas which have the device state 93 set to "off-line." Here, a physical device, which forms a free storage area, may be managed with a queue to reduce a search time. For determining whether or not each physical device, which forms a free storage area, satisfies device requirements set forth in the device allocation instruction, the ST 190 references the performance/reliability level 94, RAID configuration 95 and the like in the physical device management information 203 for each physical device.

Next, the ST 190 determines whether or not a free storage area which satisfies the conditions specified in the device allocation instruction exists in a single SA to provide the required capacity therein (step 1003).

When a certain SA 150 has a free storage area having the required capacity, which satisfies the conditions specified in the device allocation instruction, the free storage area in the SA 150 is selected as a candidate for allocation. If the required storage capacity cannot be provided by a free storage area in a single SA 150 (i.e., when physical devices subordinate to a certain SA cannot ensure the required storage capacity), it is necessary to couple a plurality of physical devices subordinate to a plurality of SA's to create a device having the required storage capacity which is assigned to the host. Therefore, the ST 190 selects free storage areas from a plurality of SA's 150 (step 1004).

If the ST 190 fails to ensure free storage areas equal to the required storage capacity at step 1004, the ST 190 reports to the storage manager or management server 110, which is the originator of the device allocation instruction, that the device allocation is impossible (steps 1005, 1010).

On the other hand, if a plurality of free storage areas belonging to a plurality of SA's can ensure a free storage area equal to the required storage capacity which satisfies the conditions specified in the device allocation instruction (step 1005), the ST 190 selects a plurality of free storage areas from a plurality of SA's 150 as candidates for allocation, selects a master SA 150 for coupling these free storage areas into a single lower logical device managed thereby, from a plurality of SA's 150 to which the candidate free storage areas belong, and determines the order in which the candidate free storage areas are coupled (step 1006). The master SA 150, selected from a plurality of candidate SA's 150, may be the one which is charged with the lowest load, by way of example. The load on the SA 150 may be determined, for example, with reference to operation information acquired by the SA 150 such as the utilization ratio of the control processor 152 in the SA 150, the amount of non-reflected data which has been held in the disk cache 154 but has not been written into the disk device, and the like, as well as the quantity of lower logical devices already defined in each SA 150, the total capacity of the lower logical devices.

Once the ST 190 has determined free storage areas assigned to the host 100 as a device accessed thereby and the master SA for coupling the free storage areas, the ST 190 defines lower logical devices and upper logical device in association with the SA 150, PA 140 and MA 160 (step 1007), and defines the LUN at the port 141 which is indicated by a parameter received together with the device allocation instruction (step 1008).

Finally, the ST 190 captures the control information updated by the logical device definition processing (step 1007) and the LU path definition processing (step 1008) from the PA 140, and outputs a completion report to the storage manager or management server, which is the originator of the device allocation request, to report the completion of the processing.

Figure 11:
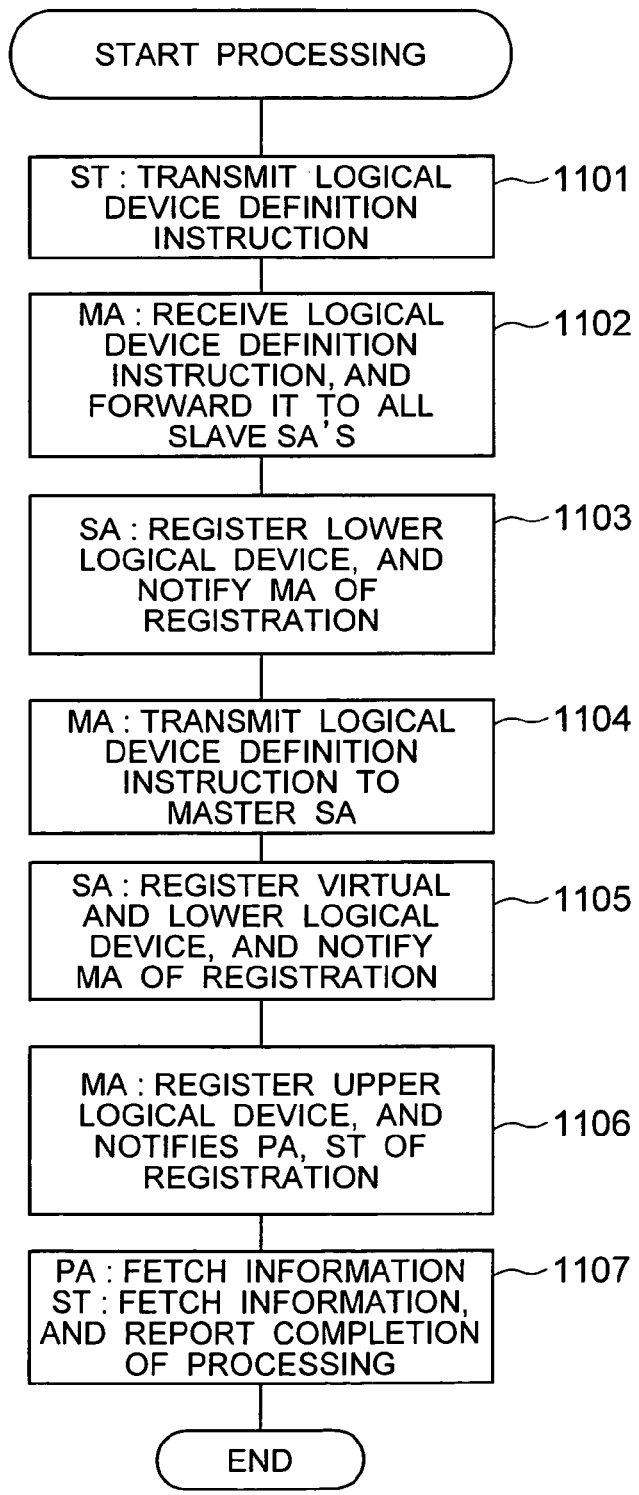
FIG. 11 is a flowchart illustrating an exemplary routine for logical device definition processing.

FIG. 11 is a flowchart illustrating an exemplary processing flow of the logical device definition processing 254. The logical device definition processing 254 defines an upper logical device and lower logical devices for physical devices mounted in the storage system 130. After the ST 190 has determined free storage areas to be assigned (i.e., physical devices corresponding to lower logical devices) through the device allocation processing 256 executed by the ST 190 (i.e., following the processing at step 1006 in FIG. 10), the ST 190 transmits a logical device definition instruction to the MA 160 (step 1101). The logical device definition instruction includes, in addition to the quantity of free storage areas to be assigned, free storage area identification information (i.e., the identification numbers of physical devices which provide the free storage areas, and the numbers of SA's 150 to which the respective free storage areas belong), a list of sets of information comprised of numbers given to the lower logical devices assigned to the free storage areas, numbers given to virtual devices assigned to the free storage areas by the master SA, and the sizes of the free storage areas, and a number given to the upper logical device assigned to the lower logical devices. The free storage areas are coupled in the order in which they are enumerated in the list, and the SA 150 which holds the free storage area registered at the top of the list functions as the master SA.

Upon receipt of the logical device definition instruction, the MA 160 determines in accordance with the logical device definition instruction whether or not a plurality of free storage areas are to be assigned to a device, and if so, whether or not the plurality of free storage areas extend over a plurality of SA's 150. If a plurality of free storage areas to be assigned are scattered in a plurality of SA's 150, the MA 160 transmits a lower logical device definition instruction to SA's other than the master SA, i.e., slave SA's for instructing them to assign lower logical devices to the physical devices which provide the free storage areas (step 1102). The lower logical device definition instruction includes the number of the master SA, the numbers of physical devices belonging to the slave SA's, the numbers of lower logical devices assigned to the physical devices, respectively, and the numbers of virtual devices assigned for the lower logical devices by the master SA. The lower logical device numbers are specified in the list within the logical device definition instruction transmitted from the ST 190 to the MA 160 at step 1101, and the virtual device numbers are also specified by the logical device definition instruction.

Upon receipt of the instruction from the MA 160, each of the slave SA's defines a lower logical device specified by the lower logical device definition instruction for a physical device which is intended for by the lower logical device definition instruction (in other words, the intended physical device is assigned a lower logical device number specified by the lower logical device definition instruction) (step 1103).

Specifically, each of the slave SA's, in accordance with the information included in the lower logical device definition instruction, sets the lower logical device number added to the lower logical device definition instruction in the entry 71; the quantity of physical devices which provide free storage areas to be assigned and the numbers given to the physical devices in the entries 75, 76, respectively; the size of the lower logical device defined by the slave SA 150 in the entry 72; the SA number of the master SA and the virtual device number assigned to the lower logical device by the master SA in the entry 74; and the device state to "on-line"; respectively, for an associated device entry of the lower logical device management information 201 (i.e., the entry corresponding to the lower logical device number added to the lower logical device definition instruction). The slave SA further sets the lower logical device number specified by the lower logical device definition instruction to the corresponding lower logical device number 95 in the physical device management information 203, and "on-line" to the device state, respectively. Upon completion of the registration, the slave SA 150 notifies the MA 160 to that effect.

Next, the MA 160 instructs the master SA to define virtual devices corresponding to the lower logical devices defined in the slave SA's, and to define a lower logical device which is a combination of a physical device and a virtual device belonging to the master SA (step 1104). This instruction includes a list of sets of information comprised of the quantity of coupled devices, identification information of the devices to be coupled (i.e., the physical device numbers or lower logical device numbers defined by the slave SA, and the slave SA numbers), the sizes of the devices to be coupled, and virtual device numbers assigned to the devices to be coupled by the master SA when the devices to be coupled are lower logical devices belonging to the slave SA's, and the lower logical device numbers defined by the master SA.

Upon receipt of the instruction, the master SA first assigns the virtual devices specified in the instruction received at step 1104 to the lower logical devices of the slave SA's at step 1105. Specifically, the master SA sets the virtual device number in the entry 81 and "on-line" in the device state entry 83 of the virtual device management information 202 corresponding to a virtual device number included in the instruction received at step 1104. The master SA further sets information on the lower logical devices of the slave SA's in the corresponding SA number/lower logical device number entry 85 and the size entry 82, and sets the lower logical device number defined by the master SA in the corresponding lower logical device number entry 84.

Then, the master SA couples the free physical device in the master SA specified at step 1104 to a virtual device, and assigns the lower logical device specified at step 1104 to the coupled devices. Specifically, the master SA sets the lower logical device number corresponding to the lower logical device received at step 1104 in the entry 71; the size of the lower logical device in the entry 72; "on-line state" in the entry 73; a corresponding upper logical device number in the entry 74; the quantity of coupled devices in the entry 75; and a list of the numbers given to physical devices or virtual devices to be coupled in the entry 76 of the lower logical device management information 201 corresponding to the lower logical device specified at step 1104. Upon completion of the registration, the master notifies the MA 160 to that effect.

Next, the MA 160 assigns an upper logical device specified by the ST 190 to the lower logical device defined by the master SA. Then, the MA 160 notifies the PA 140 and ST 190 that the upper logical device has been set (step 1106). Upon receipt of the registration notification, the PA 140 and ST 190 fetch necessary device management information (i.e., the management information held by the PA 140 and ST 190 in FIG. 2) into their respective memories, and the ST 190 reports the completion of the request processing to the device allocation processing 256 which is the requester of this processing (step 1107).

Figure 12:
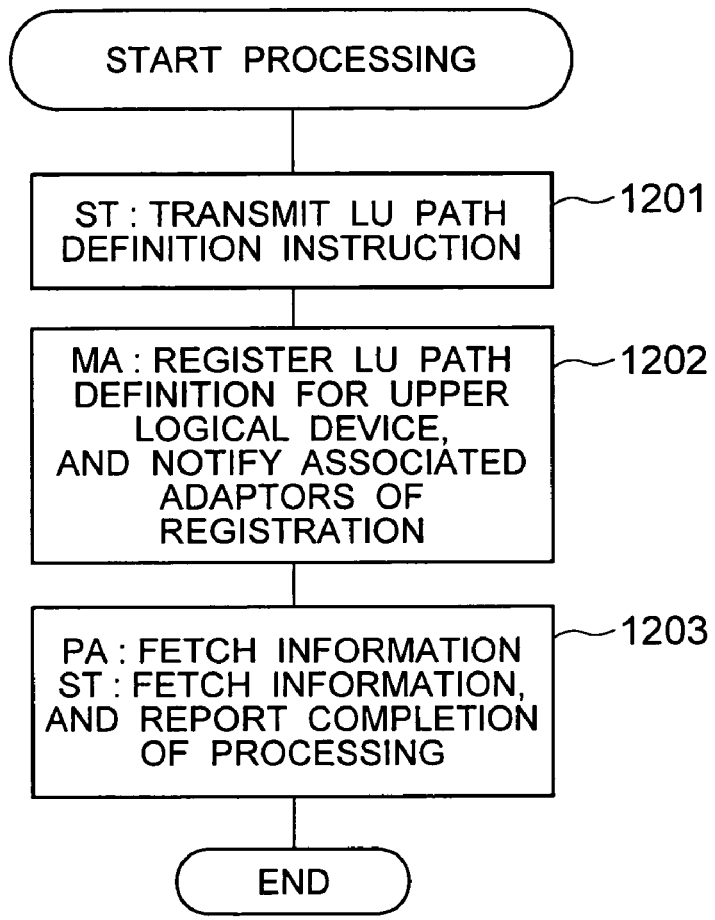
FIG. 12 is a flowchart illustrating an exemplary routine for LU path definition processing.

FIG. 12 is a flowchart illustrating an exemplary processing flow of the LU path definition processing 252. The LU path definition processing 242 involves setting a particular port 141 and LUN for an upper logical device which has been newly defined by the device allocation processing 256 and logical device definition processing 254.

First, as an upper logical device is newly assigned at step 1007 of the device allocation processing 256, the ST 190 instructs the MA 160 to define an LU path (step 1201). An LU path definition instruction additionally includes the identification of the host 100 which accesses the logical unit (WWN of a port 107 possessed by the host 100, or the like) in addition to the identification number of an associated upper logical device which defines an LU path, the number of port 441 for which the logical unit is defined, and LUN).

Upon receipt of the LU path definition instruction, the MA 160 registers an LU path for the associated target upper logical device to which a port and LUN are assigned (step 1202). Specifically, the MA 160 sets the port number, target ID, LUN in the entry 54, and connected host name in the entry 55 of the upper logical device management information 205 for the associated upper logical device in accordance with the information added to the LU path definition instruction. The MA 160 also sets the configuration information, represented by the target ID/LUN, in free entries of the LU path management information 206 corresponding to a target port 141 specified in the LU path definition instruction. Upon completion of the LU path registration and setting, the MA 160 notifies the other components of the storage system 130 to that effect. The PA 140, upon receipt of the notification, fetches the newly set and registered LU path management information and upper logical device management information, while the ST 190, upon receipt of the notification, fetches the newly set and registered LU path management information and upper logical device management information, and reports the completion of the processing to the management server 110 or storage manager which is the requester of the device allocation processing 256 (step 1203).

Next, a method of processing an input/output request received from the host 100 will be described separately in connection with request switching processing 251 in the PA 140, command processing 253 in the SA 150, and asynchronous destage processing 255 in the SA 150.

Figure 13:
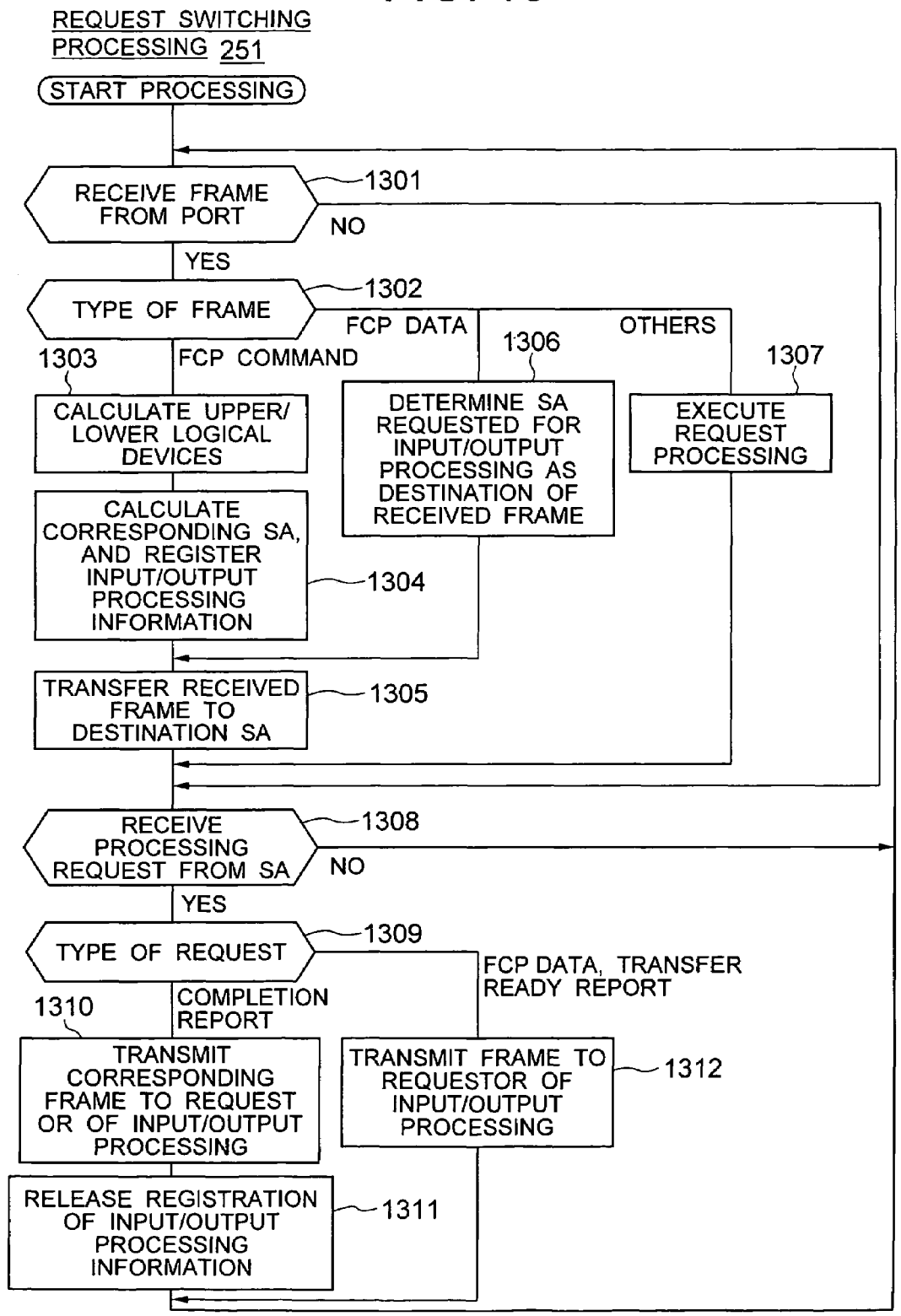
FIG. 13 is a flowchart illustrating an exemplary routine for request allocation processing.

FIG. 13 is a flowchart illustrating an exemplary processing flow of the request switching processing 251. The request switching processing 251 involves switching an input/output request and data received from the host 100 at the port 141 of the PA 140, and a transfer ready report, data and the like received from the SA 150 at the network controller 144 of the PA 140 to an appropriate component of the SA 150 or host 100.

In the request switching processing 251, upon receipt of a command frame, the PA 140 determines the destination of the frame with reference to the upper logical device management information. The PA 140 further registers routing control information of input/output processing (corresponding to exchange in the Fibre Channel) for controlling a transfer of data frames and the like which may be communicated in the input/output processing started subsequently by the command frame. The routing control information, which is independently managed by each PA 140, includes such information as identification information of the input/output processing (an exchange ID stored in a frame header in the case of the Fibre Channel), a source node and its address, a destination node and its address, and the like. The source address and destination address used for the Fibre Channel may be a source ID and a destination ID included in header information of the command frame, and LUN included in command information.

Upon receipt of the frame from the host 100 or SA 150, the control processor 142 of the PA 140 executes the request switching processing 251. First, the PA 140 determines whether the frame is received from the port 141 or from the network controller 144, and follows different processes, based on the determination, when the frame is received from the host 100 and when the frame is received from the SA 150 (step 1301, 1308).

Upon receipt of the frame from the host 100 through the port 141, the PA 140 determines the type of the frame, and switches the processing depending on the type of the received frame (step 1302). The type of the frame can be determined from information included in the frame.

When the received frame is an FCP command frame, the PA 140 calculates an SA number, a lower logical device number and the like corresponding to an upper logical device, which is intended for an access by the received command frame, with reference to the LU path management information 206 and upper logical device management information 205, based on the LUN corresponded to the upper logical device to be accessed, included in the received frame. Then, the PA 140 registers the routing control information of the command, with the calculated SA number and lower logical device number being set as the designation of the input/output processing and with the originator of the received frame (i.e., the host 100) being set as the requestor of the input/output processing (step 1303, 1304). Then, the PA 140 transmits an FCP command frame which specifies the lower logical device number calculated at step 1304 to the SA 150 calculated at step 1304 (step 1305).

When the type of the frame received by the PA 140 is an FCP data frame, the PA 140 references routing control information of the input/output processing corresponding to the received frame to determine the SA, which is registered as the destination of the input/output processing in the routing control information, as the destination of the received frame (step 1306), and forwards the received frame to the destination SA 150 (step 1305).

On the other hand, when the frame received by the PA 140 is not an FCP-based frame, the control processor 142 of the PA 140, which has received the frame, executes conventional known processing as a node port of the Fibre Channel (step 1307).

Upon receipt of a frame from the SA 150 through the network controller 144, the PA 140 determines the type of a request involved in the frame based on information included in the received frame, and switches the processing depending on the type of the request (step 1309).

When the request type of the received frame is a completion report, the PA 140 references the routing control information to determine the host 100, which is registered as the source of the input/output processing in the routing control information, as the destination of the received frame, and forwards the received frame to the host 100 (step 1310). The PA 140 further deletes the registered input/output processing information such as the source, destination and the like associated with the frame from the routing control information (step 1311).

When a frame received by the PA 140 through the network controller 144 is FCP data or a transfer ready report, the PA 140 forwards the frame to the host 100 which is registered as the requester of the input/output processing in the routing control information (step 1312).

Figure 14:
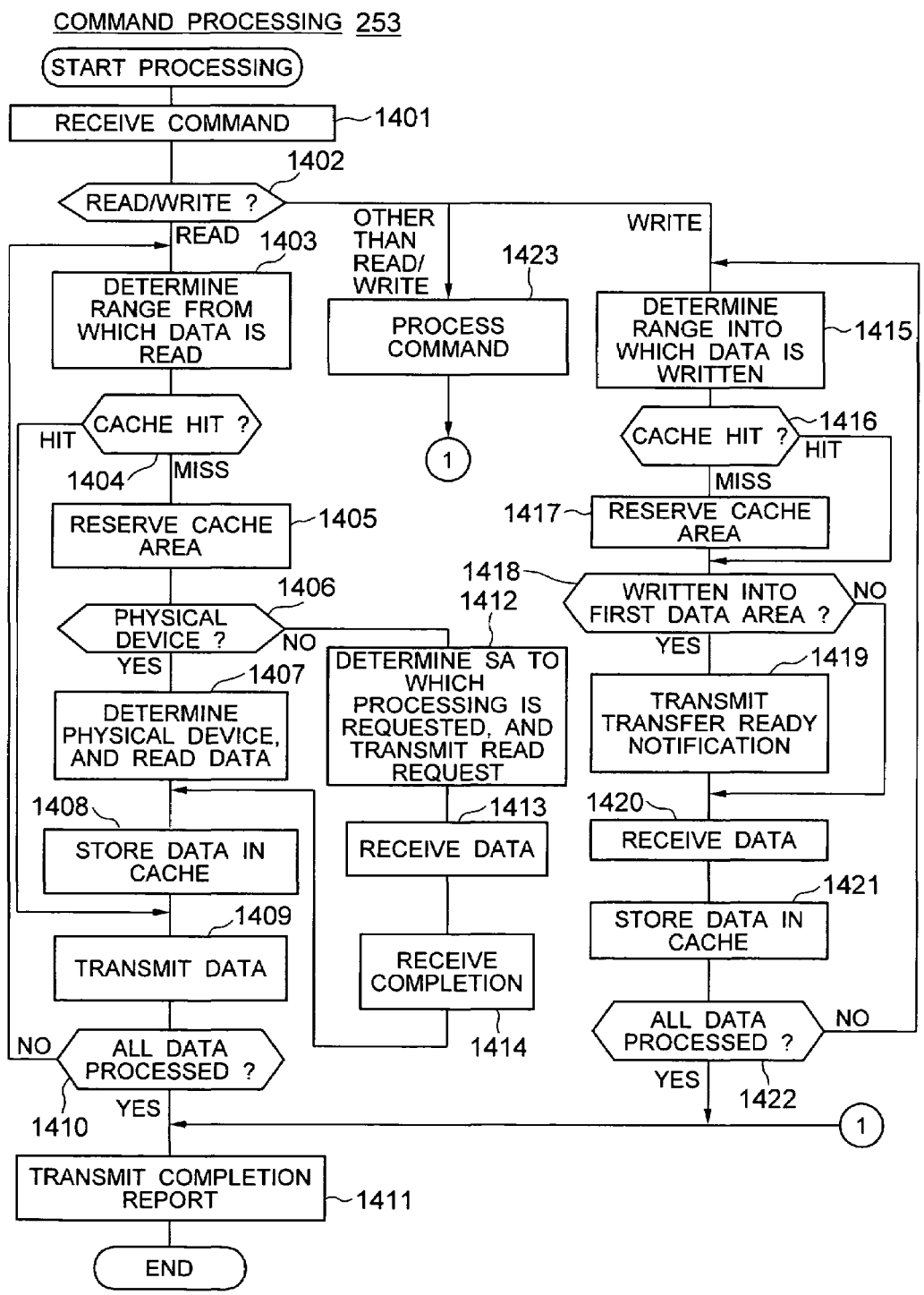
FIG. 14 is a flowchart illustrating an exemplary routine for command processing.

FIG. 14 is a flowchart illustrating an exemplary processing flow of the command processing 253. The command processing involves processing an input/output request to a lower logical device in the SA 150.

The SA 150 checks the command type of an FCP command frame received from the internal network 170 through the network controller 150 based on information included in the FCP command frame (steps 1401, 1402).

When the FCP command requests a read, the SA 150 first references the lower logical device management information to examine a range covered by the read request. When a lower logical device to be accessed extends over a plurality of physical devices or virtual devices, and when the read request range extends over a plurality of physical devices or virtual devices, the SA 150 determines a read cover range for each of the physical devices or virtual devices (step 1403).

Then, the SA 150 determines with reference to cache management information 204 whether the data hits in the disk cache 154 (i.e., the disk cache 154 has stored the data in the read request range of the first physical device or first virtual device of the lower logical device) (step 1404). When a cache hit occurs, the SA 150 starts transmitting data to the PA 140 at step 1409. Conversely, when a cache miss occurs, the SA 150 updates the cache management information 204 to reserve an area in the disk cache 154 (step 1405), and executes staging to the cache from the physical device or virtual device which stores data to be read. The SA 150 can determine whether data to be read is stored in a physical device or a virtual device by referencing the lower logical device management information 201 (step 1406).

When the data to be read is stored in a physical device, the SA 150 issues a read request to a disk device 157 identified from the physical device management information 203 to read the data (step 1407), and stores the read data in the reserved area of the disk cache 154 (step 1408).

When the data to be read is stored in a virtual device, the SA 150 references the virtual device management information 202 to calculate an SA 150 to be accessed and a lower logical device number from the entry 85. Then, the SA 150 transmits a read request for the calculated lower logical device to the calculated SA 150 (step 1412). The different SA 150, which receives the read request transmitted at step 1412, reads the data through the command processing 253, transfers the read data to the requesting SA 150 which has requested the read, and also transmits a completion report to the requesting SA 150. Upon received of the read data and completion report, the requesting SA 150 stores the received data in the disk cache 154 (steps 1413, 1414, 1408).

As the read data is stored in the disk cache 154, the SA 150 transmits the read data stored in the disk cache 154 to the originator of the FCP command frame received at step 1401 (step 1409). When the FCP command was originated from the PA 140, the PA 140 receives the read data which is then forwarded to the host 100 through the request switching processing 251 (see steps 1308, 1309, 1312 of the request switching processing 251). When the FCP command was originated from a different SA 150, the data is directly transferred to this SA 150. This sequence of processing (steps 1403–409, 1412–414) is repeated until all data has been processed in the read request range (step 1410), followed by final transmission of a processing completion report to the host 100 or different SA 150 which is the originator of the command (step 1411).

On the other hand, when the FCP command frame received by the SA 150 requests a write, the SA 150 likewise references the lower logical device management information to examine a write request range. When a lower logical device to be accessed is a combination of plural physical devices or virtual devices, and when the write request range extends over a plurality of physical devices or virtual devices, the SA 150 determines a write intended range for each of the physical devices or virtual devices (step 1415).

Next, the SA 150 determines whether or not data corresponding to the write intended range is stored in the disk cache 154 (step 1416), and allocates an area in the disk cache 154 if a cache miss occurs (step 1417).

Next, the SA 150 transfers a transfer ready notification to the originator of the FCP command frame received at step 1401 only when the currently processed write intended range is the first region of the requested range (steps 1418, 1419). When the originator of the FCP command frame is the host 100, the PA 140, which has received the transfer ready notification, forwards the transfer ready notification to the host 100 through the request switching processing 251. As write data is subsequently sent from the host 100, the PA 140 transmits the data to the SA 150 which has transmitted the transfer ready notification. When the originator of the FCP command frame is a different SA 150, the transfer ready notification is transmitted to this SA 150 through the internal network 170. Subsequently, write data is sent to the SA 150, which has transmitted the transfer ready notification, from the originator SA 150 through the internal network 170.

The SA 150 stores the received write data in a reserved area on the disk cache 154 (steps 1420, 1421). This sequence of operation (steps 1415–421) is repeated for all data in the write request range (step 1422), followed by final transmission of a processing completion report to the host 100 or different SA 150 which has transmitted the command (step 1411). The write data written into the disk cache 154 is written into a disk device, as will be later described with reference to FIG. 15.

When a command received by the SA 150 is not a read or a write, but a sense-related command, for example, a mode sense or the like, or a diagnosis-related command, the SA 150 executes appropriate processing based on the specification of an ordinary SCSI storage (step 1423), and sends a completion report.

Figure 15:
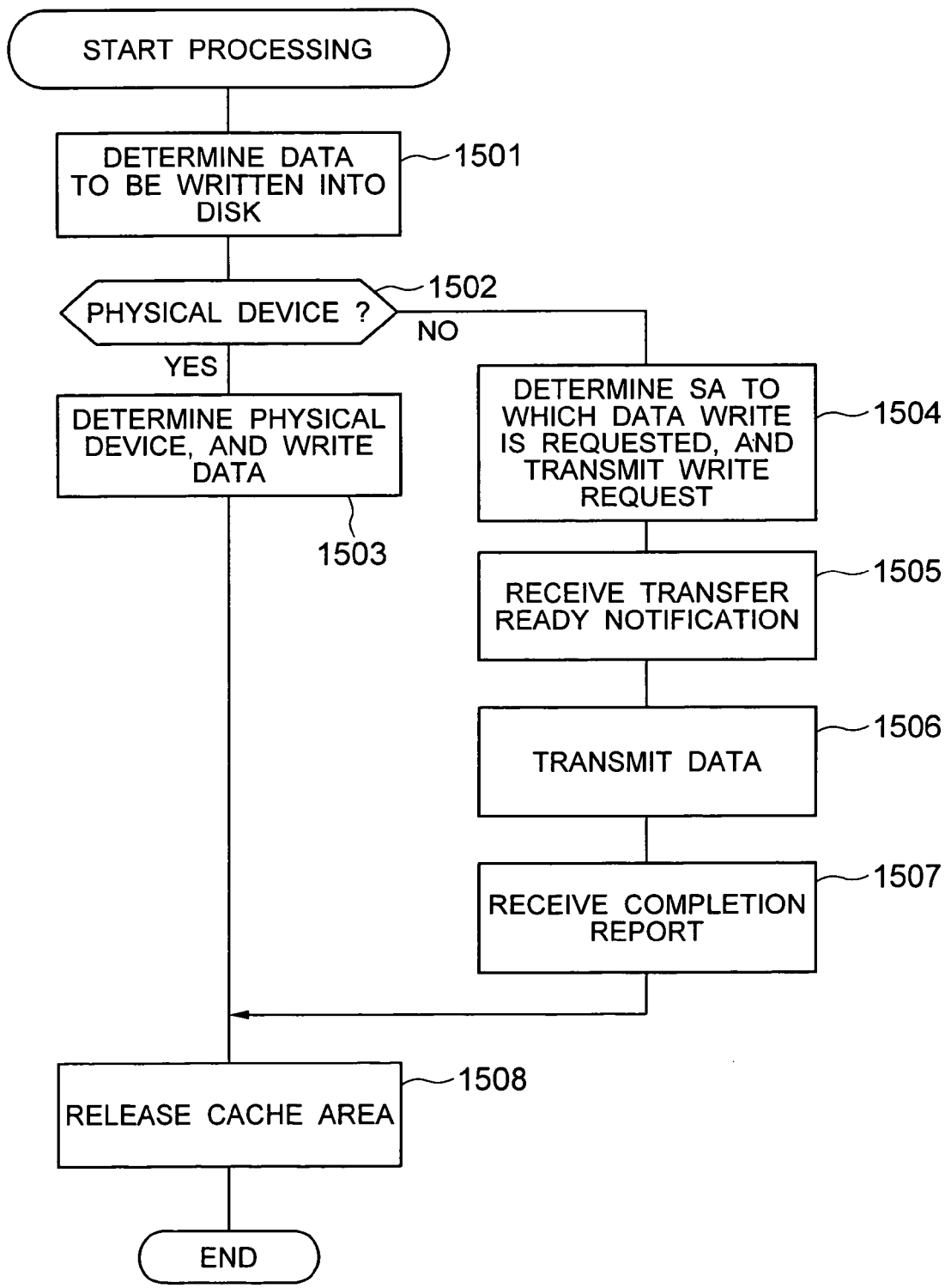
FIG. 15 is a flowchart illustrating an exemplary routine for asynchronous destage processing.

FIG. 15 is a flowchart illustrating an exemplary processing flow of the asynchronous destage processing 257. The asynchronous destage processing involves writing write data stored in the disk cache 154 into the disk device 157 as a result of the command processing 253 in the SA 150.

Write data held on the disk cache 154 is managed by the cache management information 204. Generally, write data and read data read from a disk are managed by a queue or the like such that older data is removed earlier from the disk cache 154 in order. The SA 150 selects data which is actually written into the disk device 157 from such data managed by a conventional known method (step 1501), and determines based on the lower logical device management information 201 whether or not the disk device into which the data is written is corresponding to a virtual device or to a physical device (step 1502).

For writing write data into a physical device, the SA 150 identifies a disk device 157, into which the data is written, with reference to the physical device management information 203, and writes the write data into the identified disk device 157 (step 1503).

On the other hand, for writing write data into a virtual device, the SA 150 identifies a different SA 150 corresponded to the virtual device, and a lower logical device corresponded to a virtual device managed by the different SA 150 with reference to the virtual device management information 202, and transmits a write request which specifies the identified lower logical device to the identified SA 150 (step 1504). Upon receipt of the write request, the SA 150, which is involved in the write, writes the data through the command processing 253. Since the SA 150 involved in the write transmits a transfer ready notification to the SA 150, which is the originator of the write request, at step 1419 of the command processing 253, the SA 150, which has received the transfer ready notification, transmits the write data to the SA 150 involved in the write, and receives a completion report as a response to the request (steps 1505–507). As the processing at step 1503 or 1507 is completed, the SA 150 releases the reserved area of the disk cache 154 in which the write data has been stored (step 1508).

The foregoing description has been illustratively made on an exemplary cluster storage system in which the master storage adaptor couples a physical device belonging thereto and lower logical devices belonging to other storage adaptors to manage them as a single lower logical device, and the protocol adaptor corresponds an upper logical device to lower logical devices for managing the logical devices.

[Second Embodiment]

Next, a second embodiment will be described with reference to FIGS. 4, 5, 16.

In a cluster storage system according to the second embodiment, the protocol adaptor also recognizes the boundaries of a lower logical device made up of a plurality of physical devices or virtual devices which are coupled by the storage adaptor. When an access is requested from a host to an upper logical device corresponding to a lower logical device, the protocol adaptor determines a storage device to which the access request is transmitted in accordance with the start address of an access range. This can limit communications between the storage adaptors to reduce the load on the storage adaptors. It should be noted that since the second embodiment has substantially the same hardware and software configurations as the first embodiment, the following description will be centered only on differences therebetween.

Figure 4:
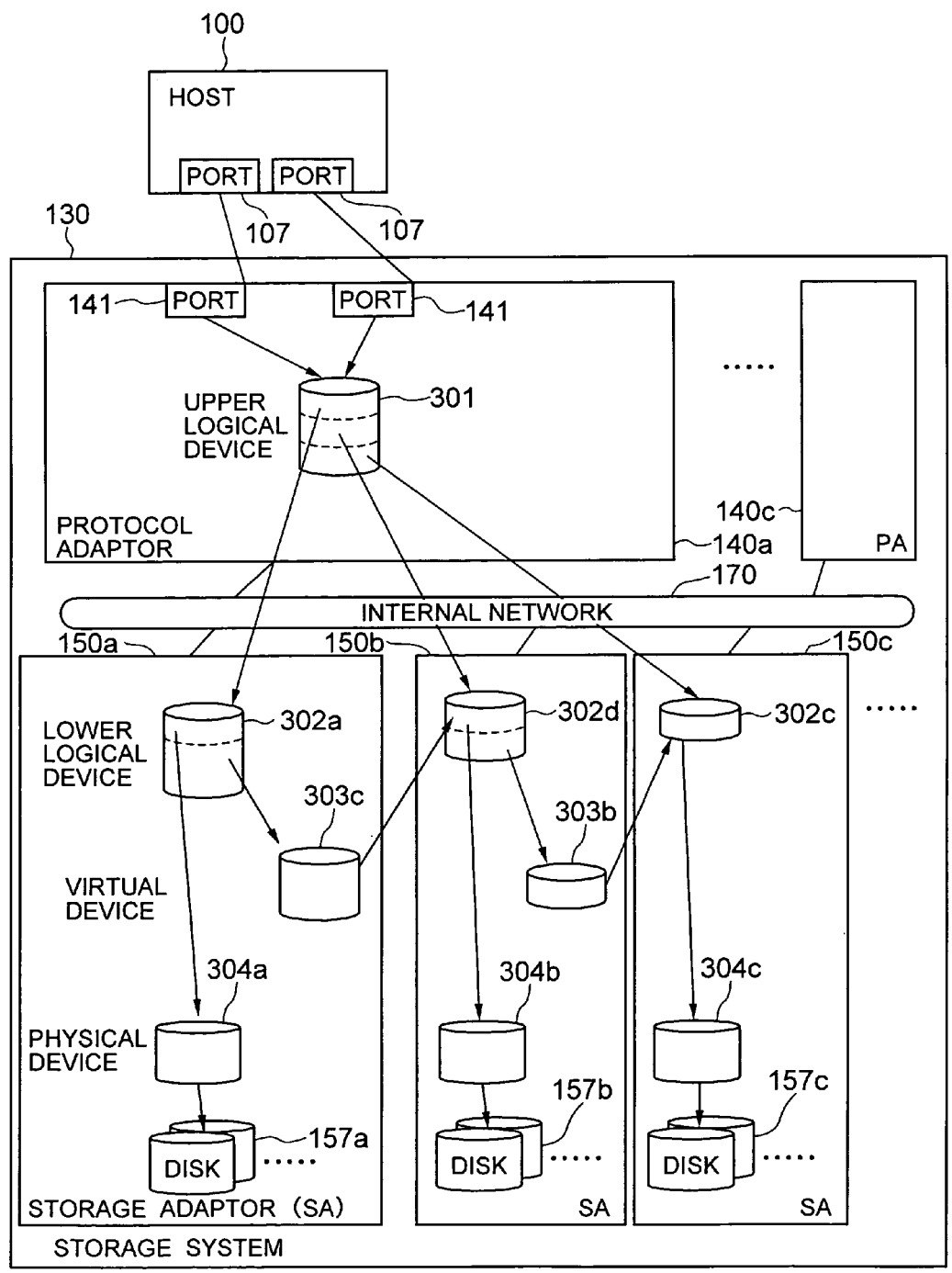
FIG. 4 is a block diagram illustrating another exemplary device hierarchy in the storage system to which the present invention is applied.

FIG. 4 illustrates a device hierarchy in the cluster storage system according to the second embodiment. The illustrated device hierarchy differs from the first embodiment in that devices are coupled not only by the first SA (master SA) but also by subsequent SA's (slave SA's), and that the PA 140 recognizes the boundaries of lower logical devices coupled by the SA 150 to determine a particular SA 150 to which an I/O request is forwarded, depending on a location which is accessed.

For example, in the hierarchy illustrated in FIG. 4, a storage adaptor 150*b* assigns a virtual device 303*b* to a lower logical device 302*c* belonging to a storage adaptor 150*c*, and the storage adaptor 150*b* couples the virtual device 303*b* to a physical device 304*b* belonging to the storage adaptor 150*b* for managing them as a lower logical device 302*d*. Further, a storage adaptor 150*a* assigns a virtual device 303*c* to a lower logical device 302*b*, and the storage adaptor 150*a* couples the virtual device 303*c* to a physical device 304*a* belonging to the storage adaptor 150*a* for managing them as a lower logical device 302*a*. Furthermore, a protocol adaptor 140*a* assigns an upper logical device 301 to the lower logical device 302*a* managed by the storage adaptor 150*a* for management, but the protocol adaptor 140*a* recognizes that a storage area from the beginning to a first boundary address in the upper logical device 301 is corresponding to the lower logical device 302*a*; a storage area from the first boundary address to a second boundary address is corresponding to the lower logical device 302*d*; and a storage area from the second boundary address to the last address is corresponding to the lower logical device 302*c*, respectively.

In this way, in the second embodiment, the PA 140 is required to be aware of boundary addresses of an upper logical device at which lower logical devices are coupled, i.e., to recognize a one-to-multiple correspondence relationship between an upper logical device and lower logical devices, resulting in a different format required for the upper logical device management information 205 from the first embodiment, as shown in FIG. 5. Specifically, the upper logical device management information 205 has a corresponding lower logical device quantity entry 56 which stores the quantity of lower logical devices to which an associated upper logical device corresponds. Also, a corresponding SA number/lower logical device list entry 57 stores a list of sets of information comprised of lower logical device numbers of a plurality of lower logical devices to which the upper logical device corresponds, SA numbers, and offsets in upper logical device corresponding to the respective lower logical devices.

Since the second embodiment differs from the first embodiment in the method of managing the correspondence relationship of an upper logical device to lower logical devices, the second embodiment accordingly differs from the first embodiment in the logical device definition processing 254 and request switching processing 251 in the processing executed by respective associated components of the storage system.

Figure 16:
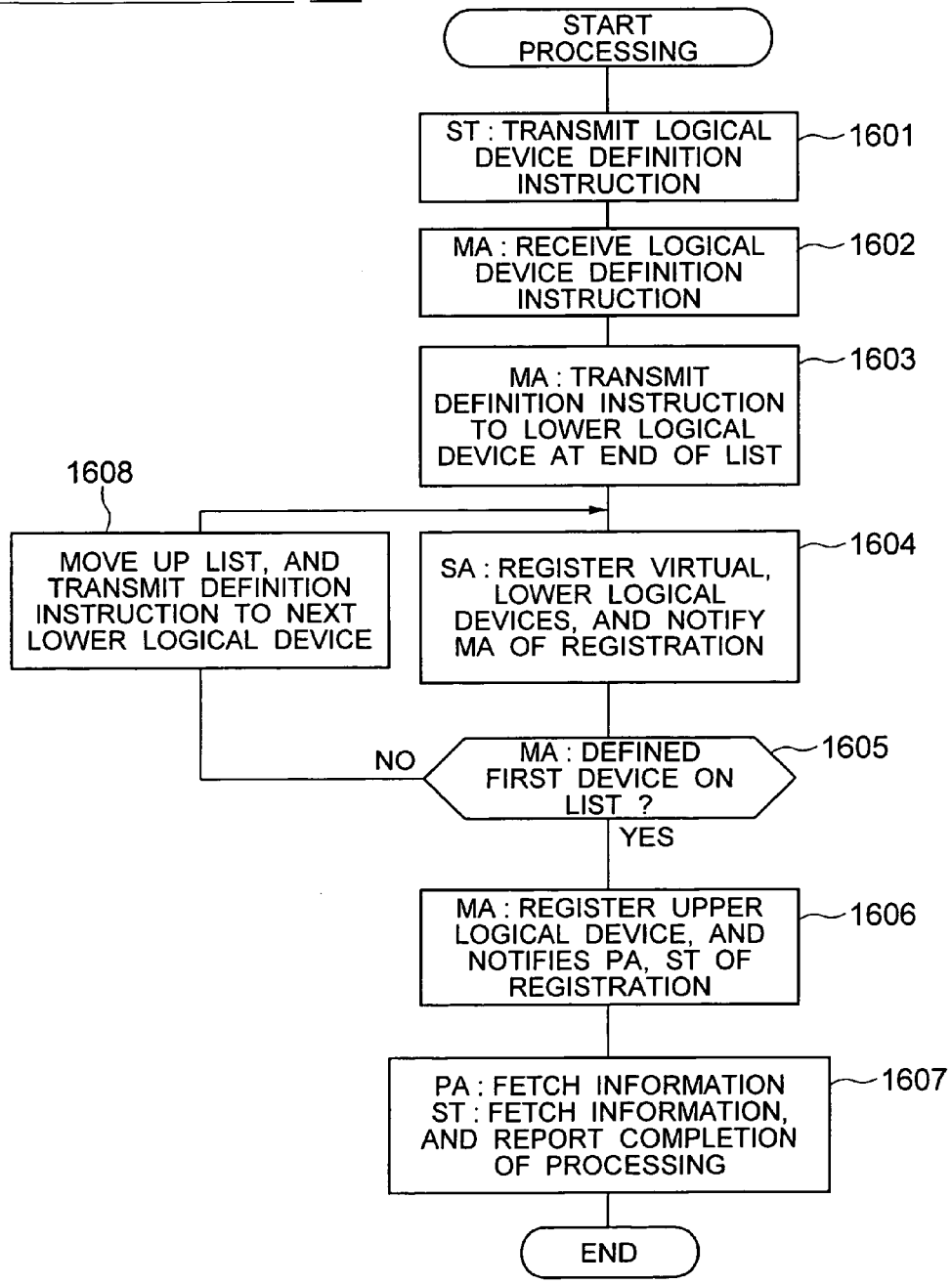
FIG. 16 is a flowchart illustrating another exemplary routine for logical device definition processing.

Referring to FIG. 16, description will be made on one example of the logical device definition processing 254 in the second embodiment. The second embodiment differs from the first embodiment in that the lower logical device definition is instructed to a plurality of slave SA's in parallel at step 1102 such that the plurality of slave SA's execute the lower logical device definition in parallel in the flow of FIG. 11, whereas the lower logical device definition is executed in order from the last SA 150 in a coupling order in the flow of FIG. 16. In this event, each SA defines a virtual device for a lower logical device defined by the SA 150 which has executed the lower logical device definition immediately before (i.e., makes a lower logical device defined by the preceding SA correspond to a virtual device), and couples a physical device existing therein to the virtual device to define a lower logical device.

Specifically, the ST 190 transmits a logical device definition instruction to the MA 160 at step 1601. Upon receipt of the instruction (step 1602), the MA 160 references a list of free storage areas included in the logical device definition instruction, and transmits a lower logical device definition instruction to a SA which has the free storage area registered at the end of the list to define a lower logical device for this free storage area (step 1603).

Upon receipt of the logical device definition instruction, the SA 150 assigns a lower logical device to the free storage area. When the SA 150 is instructed by the received logical device definition instruction to couple a free storage area belonging thereto (i.e., a physical device) to a lower logical device belonging to a different SA 150 to create a lower logical device, the SA 150 makes a virtual device correspond to the lower logical device belonging to the different SA 150, and subsequently couples the virtual device to the free storage area belonging thereto to define the resulting product as a single lower logical device. Then, the SA 150 reports the MA 160 that the lower logical device has been registered (step 1604).

Upon receipt of the report, the MA 160 checks whether or not the lower logical device, which has been registered, corresponds to a free storage area registered at the top of the free storage area list included in the logical device definition instruction from the ST 150 (step 1605). If this lower logical device does not correspond to the free storage area registered at the top of the list, the MA 160 transmits a lower logical device definition instruction to the SA 150 which has the second free storage area from the end of the list (step 1608). The processing at steps 1604, 1605, 1608 is repeated until a lower logical device is defined for the free storage area registered at the top of the list.

After a lower logical device has been defined for the free storage area registered at the top of the list, the MA 160 assigns an upper logical device specified by the ST 190 to the lower logical device defined at the last, and notifies the PA 140 and ST 190 to that effect (step 1606).

Upon receipt of the notification, the PA 140 and ST 190 fetch device management information received from the MA 160 into their memories, and the ST 190 further transmits a completion report for the device allocation processing 256.

The request switching processing 251 in the second embodiment differs from the request switching processing in the first embodiment in the method of calculating a lower logical device at step 1303 in FIG. 13. Specifically, in the processing for calculating a destination SA 150 for a command frame received from the host 100 and a lower logical device number, the PA 140 references not only the LUN but also LBA (Logical Block Address) to determine the destination SA 150, to which the frame is transmitted, from the corresponding SA number/lower logical device list 57 in the upper logical device management information 205. Specifically, the PA 140 references the LBA (i.e., address information) of the received command frame, and the offset information registered in the corresponding SA number/lower logical device list 57 of the upper logical device management information 205 to determine which SA 150 has a disk that includes a storage area corresponding to a storage area indicated by the LBA, and transmits the command frame to the SA 150 which actually has the storage area that corresponds to the storage area indicated by the LBA. In this event, the LBA in the command frame transmitted to the SA 150 is modified to a relative value from a lower logical device start offset of that SA 150.

[Third Embodiment]

Next, a third embodiment will be described with reference to FIGS. 17 to 20.

Figure 17:
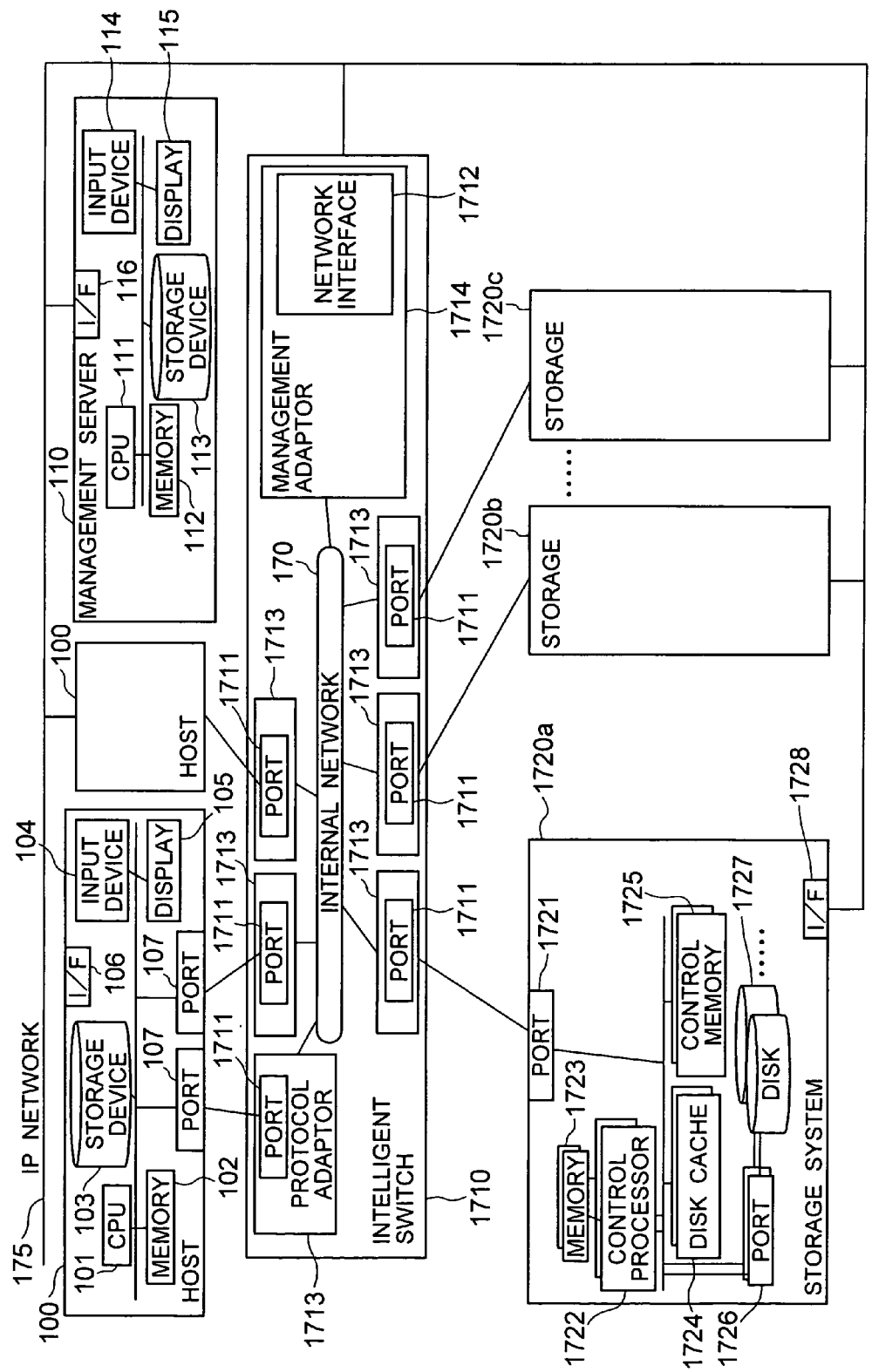
FIG. 17 is a block diagram illustrating another exemplary hardware configuration of a computing system to which the present invention is applied.

FIG. 17 is a block diagram illustrating an exemplary hardware configuration of a computing system to which the third embodiment of the present invention is applied. One or more hosts 100 and one or more storage systems 1720 are interconnected through an intelligent switch 1710. The respective components are coupled by a network subordinate to the SCSI, which is in position of upper protocol, such as the Fibre Channel. The respective components are also connected to and managed by a management server 110 through an IP network 175.

The host 100 and management server 110 are similar in configuration to the counterparts in FIG. 1. The storage system 1720 may be a cluster storage system such as the storage system 130 in FIG. 1, or a monolithic storage. FIG. 17 illustrates a port 1720 connected to the intelligent switch 1710; a control processor 1722; a memory 1723; a control memory 1725; a port 1726 connected to a disk device 1727; the disk device 1727; and the storage system 1720 having an interface controller 1728 connected to the IP network 175.

The intelligent switch 1710 is a Fibre Channel switch having a device virtualization function which is comprised of a protocol adaptor 1713; a management adaptor 1714, and internal network 170. Here, the management adaptor 1714 exclusively manages target ports, LUN and logical devices provided by the intelligent switch 1710 to the host 100, and therefore resources of the storage system 1720 are not essentially managed by the management adaptor 1714. The resources of the storage system 1720 are collectively managed by the management server 110.

In the computing system of the third embodiment, the intelligent switch 1710 and storage system 1720 have the device virtualization function. The intelligent switch 1710 manages upper logical devices, while the storage system 1720 manages lower logical devices, virtual devices and physical devices. In other words, the correspondence relationship between lower logical devices and upper logical devices is managed by the intelligent switch 1710, whereas the correspondence relationship between disk devices and physical devices, the correspondence relationship between lower logical devices and virtual devices in other storage systems, and the correspondence relationship between physical devices or virtual devices and lower logical devices are managed by the storage system 172.

The third embodiment differs from the first and second embodiments in that the intelligent switch 1710 and storage system 1720 are mounted with ports, so that the intelligent switch 1710 and storage system 1720 must manage LU path definition information. Also, the intelligent switch 1710 specifies a lower logical device managed by the storage system 1720 using LUN, and the storage system 1720 also specifies a lower logical device managed by a different storage system 1720 using LUN. Therefore, the LU path management information shown in FIG. 6 must be provided not only for upper logical devices managed by the intelligent switch 1710 but also for lower logical devices managed by the respective storage systems 1720. Further, the corresponding SA number/lower logical device number list 57 in the upper logical device management information 205 shown in FIG. 5, and the corresponding SA number/lower logical device number list 85 in the virtual device management information 202 shown in FIG. 8 must be registered with address information for identifying a particular storage system 1720 and lower logical device, such as a port ID, LUN and the like which are used for accessing the lower logical device.

An access between storage systems 1720 such as a read, a write and the like is made based on the same protocol as a normal access between the host 100 and the storage system 1720.

Figure 20A:
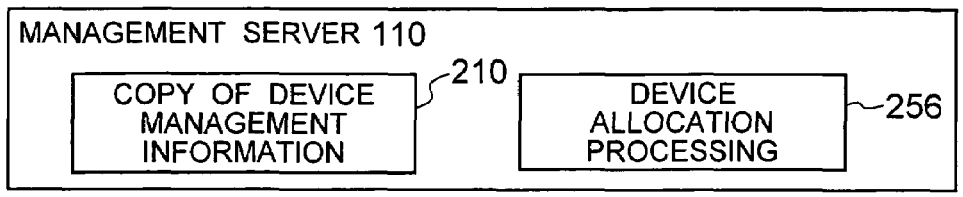
FIGS. 20A, 20B and 20C are block diagrams illustrating another exemplary software configuration of a storage system to which the present invention is applied.
Figure 20B:
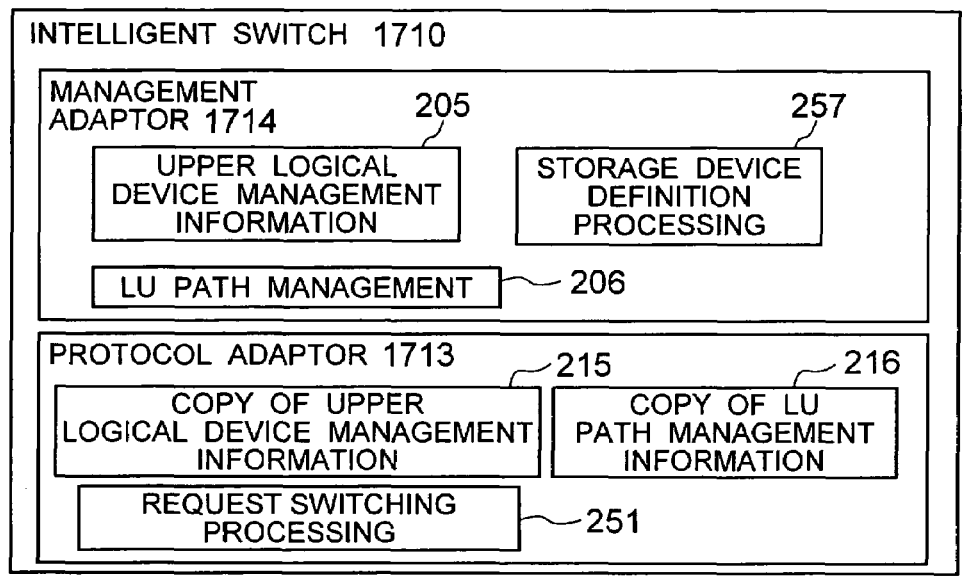
Figure 20C:
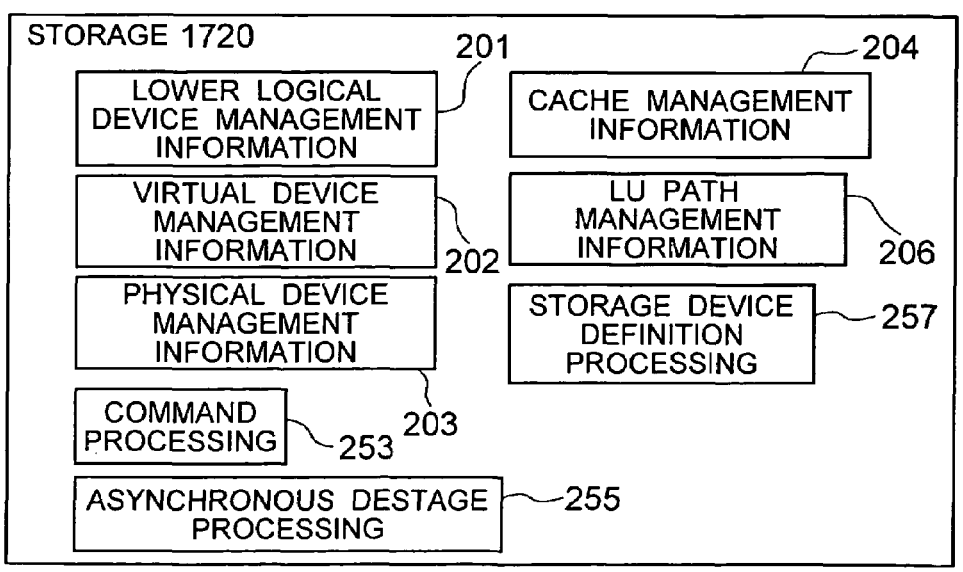

FIGS. 20A–20C illustrate the layout of control information and control programs in the computing system to which the third embodiment of the present invention is applied. In the third embodiment, the management server 100 is fully responsible for the interface with the storage manager. Therefore, the device allocation processing 256 executed by the ST 190 in the first embodiment is taken over by the management server 110 which takes the initiative in the execution of the device allocation processing 256 in association with storage device definition processing 257 executed by the management adaptor 1714 of the intelligent switch 1710 and the control processor 1722 of the storage system 1720.

Specifically, in the storage device definition processing 257, the intelligent switch 1710, upon receipt of a device definition instruction from the management server 110, forwards the device definition instruction to slave storage systems 1720. In accordance with the received device definition instruction, each slave storage system 1720 defines a lower logical device for a physical device contained therein, and assigns a port and LUN to the lower logical device. Then, the slave storage system 1720 transmits a device definition completion report to the intelligent switch 1710. Upon receipt of the completion report, the intelligent switch 1710 transmits a device definition instruction to a master storage adaptor. Upon receipt of the device definition instruction (step 1901), the master storage system 1720 makes a lower logical device of a slave storage system correspond to a virtual device (step 1902), couples the virtual device to a physical device in the master storage system 1720, assigns a lower logical device to the coupled device, and assigns a port 1721 and LUN to the lower logical device (step 1903). Then, the master storage system 1720 transmits a device definition completion report to the intelligent switch 1710 (step 1904).

Upon receipt of the completion report, the intelligent switch 1710 assigns an upper logical device to a port ID and LUN corresponding to the lower logical device managed by the master storage system 1720, and further assigns a port ID and LUN provided by the intelligent switch 1710 to the host 100 for the upper logical device.

When an access request is made from the host 100 to the upper logical device thus defined, the intelligent switch 1710 calculates the master storage system 1720 and lower logical device corresponding to the upper logical device, and transmits an access request having a port ID and LUN corresponding to the lower logical device to the master storage system 1720. Then, the master storage system 1720 directs the access request to a physical device contained therein corresponding to the lower logical device, or to a virtual device. Here, when the access request is directed to a virtual device, the master storage system 1720 identifies a lower logical device corresponding to the virtual device, and a different storage system 1720 to which the lower logical device belongs, acquires a port ID and LUN corresponding to the lower logical device, and transmits an access request having the acquired port ID and LUN to the identified storage system 1720.

It should be understood that the present invention is not limited to the foregoing embodiments, but can be modified in various manners.

For example, in the third embodiment, the intelligent switch 1710 for connecting the host 100 to the storage systems 1720 has the device virtualization function, but a normal Fibre Channel switch without the device virtualization function may be substituted for the intelligent switch 1710. In this case, an access request having the port ID and LUN of a storage system 1720 will be transmitted in order for the host 100 to access a storage area. Specifically, the host 100 will transmit an access request which has the port ID of a port possessed by the master storage system 1720, and the LUN assigned by the master storage system 1720 to a logical device to be accessed. Therefore, the port, LUN, device number are apparently different, when viewed from the host 100, depending on which storage system is specified to be the master storage system for coupling devices.

In the cluster storage system according to the present invention, a single storage adaptor can couple free storage areas scattered in a plurality of storage adaptors to manage the free storage areas as a single logical device. Thus, the storage adaptor can also execute such processing as data duplication, remote duplication and the like for coupled devices which are managed as a single logical device.

The method of coupling storage areas scattered in a plurality of storage systems or in a plurality of storage adaptors within a cluster storage system to manage the storage areas as a single logical device may be implemented by using volume virtualization software such as a volume manager installed in the host, or by coupling storage areas using a switch (corresponding to the protocol adaptor in the first and second embodiments, and the intelligent switch in the third embodiment) connected to a plurality of storage systems or to a plurality of storage adaptors in a cluster storage system for executing I/O switching processing.

However, for using the software installed in the host, it is necessary to develop a particular version of software which supports each of different platforms and install the software in the host, possibly encountering difficulties in implementation depending on the user environment. In contrast, according to the present invention, the volume coupling function is provided by the storage adaptor in a storage system or a cluster storage system, thus making it possible to support a plurality of different platforms.

When a switch is responsible for the coupling of storage areas, more complicated access switching processing would be executed by the switch for a plurality of storage systems or storage adaptors. For example, when the switch receives a read request from a host computer for reading data from a logical device which extends over storage areas in a plurality of storage adaptors, the switch will convert the received read request to a read request suited to each storage adaptor, sends the converted read request to each storage adaptor, wait for the completion of the processing in all these storage adaptors, and transfer read data to the host computer. Consequently, the I/O switching control is more complicated as compared with a normal switch. It is also necessary to provide an extra buffer memory for holding read data which is previously retrieved during a delay caused by waiting for a plurality of I/O operations, leading to an increase in the manufacturing cost of the switch. On the other hand, according to the present invention, particularly in the first embodiment, a cost-scalable storage system can be provided without increasing the manufacturing cost of the switch because the system doe not require a complicated control logic of the switch for switching accesses.

As a result, the present invention can provide a storage pool function which can effectively and rapidly couple free storage areas scattered in a plurality of clusters to offer the coupled free storage areas as a single device.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A cluster storage system comprising:
   a first storage node and a second storage node, each of which has at least one disk and a processor for controlling an access to said at least one disk;
   a host interface node for receiving an access request for a logical device from a computer and forwarding the access request to either said first storage node or said second storage node in accordance with the access request; and an internal network for interconnecting said first storage node, said second storage node and said host interface node, wherein one of said first storage node and said second storage node manages a first storage area existing on the disk in said first storage node and a second storage area existing on the disk in said second storage node as a single logical device, wherein said host interface node, in response to an access request having identification information corresponding to said logical device received from said computer, forwards the access request to a storage node which manages said logical device based on the received access request, wherein said storage node which manages said logical device, in response to the access request received thereby, determines whether a storage area to be accessed is included in said first storage area or said second storage area, and forwards the access request to the other storage node when the storage area to be accessed does not belong to the storage area in said storage node which manages said logical device, wherein said first storage node manages said first storage area belonging to said first storage node as a first physical device, wherein said second storage node manages said second storage area belonging to said second storage node as a second physical device, and said second storage node manages said second physical device as a second lower logical device, wherein said first storage node manages said second lower logical device as a first virtual device, and said first storage node manages a storage area having said first physical device and said first virtual device as a first lower logical device, wherein said host interface node manages said first lower logical device as an upper logical device, wherein said host interface node, in response to an access request having identification information of said upper logical device received from said computer, transmits an access request for said first lower logical device to said first storage node, and wherein said first storage node, in response to an access request for said first lower logical deice received from said host interface node, transmits an access request for said second lower logical device corresponding to said first virtual device to said second storage node when a storage area to be accessed belong to the storage area in said second storage node.

2. A cluster storage system according to claim 1, wherein:
said storage node which manages said logical device is a storage node that is charged with a lower load of said first storage node and said second storage node.

3. A cluster storage system according to claim 2, wherein the load on a storage node is determined based on the utilization ratio of the processor included in said storage node.

4. A cluster storage system according to claim 2, wherein the load on a storage node is determined based on the amount of data which is not stored in the disk included in said storage node within data stored in a cache memory included in said storage node.

5. A cluster storage system according to claim 1, wherein:
said first storage node, in response to an access request for said first lower logical device received from said host interface node, accesses said first physical device when a storage area to be accessed belong to the storage area in said first storage node.

6. A cluster storage system according to claim 1, wherein:
said first storage node, in response to an access request for said first lower logical device received from said host interface node, transmits an access request for said second lower logical device corresponding to said first virtual device to said second storage node, and also accesses said first physical device when a storage area to be accesses has both of a storage area included in said second storage area and a storage area included in said first storage area.

7. A cluster storage system comprising:
a first storage node, a second storage node, and a third storage node, each of which has at least one disk, and a processor for controlling an access to said at least one disk;

a host interface node, responsive to a request for accessing a logical device received from a computer, for forwarding the access request to said first storage node, said second storage node, or said third storage node in accordance with the received access request; and an internal network for interconnecting said first storage node, said second storage node, said third storage node, and said host interface node, wherein said second storage node manages a third storage area existing on the disk in said third storage node and a second storage area existing on the disk in said second storage node as a single logical device, wherein said first storage node manages a first storage area existing on the disk in said first storage node and said logical device managed by said second storage node as a single logical device, wherein said host interface node, in response to an access request having identification information corresponding to said logical device managed by said first storage node, received from said computer, forwards the access request to one of said first storage node, said second storage node, and said third storage node based on the received access reguest, wherein said third storage node manages said third storage area as a third physical device, and manages said third physical device as a third lower logical device, wherein said second storage node manages said third lower logical device as a second virtual device, manages said second storage area as a second physical device, and manages a storage area comprised of said second virtual device and said second physical device as a second lower logical device, wherein said first storage node manages said second lower logical device as a first virtual device, manages said first storage area as a first physical device, and manages a storage area comprised of said first virtual device and said first physical device as a first lower logical device, wherein said host interface node manages said first lower logical device as an upper logical device, and manages a storage area corresponding to said second lower logical device and a storage area corresponded to said third lower logical device in said upper logical deviced, and wherein said host interface node, in response to an access request having identification information of said upper logical device received from said computer, transmits an access request for said third lower logical device to said third storage node when the received access request involves an access to a storage area corresponding to said third lower logical device.

8. A cluster storage system according to claim 7, wherein: said host interface node forwards access request received from said computer to said first storage node when the access request involves an access to a storage area included in said first storage area; forwards the received access request to said second storage node when the access request involves an access to a storage area included in said second storage area; and forwards the received access request to said third storage node when the access request involves an access to a storage area included in said third storage area.

9. A cluster storage system according to claim 7, wherein: said first storage node is charged with a lower load than said second storage node and said third storage node.

* * * * *